US 7,844,139 B2

(12) United States Patent
Iwasaki

(10) Patent No.: US 7,844,139 B2
(45) Date of Patent: Nov. 30, 2010

(54) INFORMATION MANAGEMENT APPARATUS, INFORMATION MANAGEMENT METHOD, AND COMPUTER PROGRAM PRODUCT

(75) Inventor: Masajiro Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1112 days.

(21) Appl. No.: 11/521,042

(22) Filed: Sep. 13, 2006

(65) Prior Publication Data
US 2007/0065045 A1   Mar. 22, 2007

(30) Foreign Application Priority Data
Sep. 16, 2005   (JP) .............. 2005-270682

(51) Int. Cl.
G06K 9/54   (2006.01)
G06K 9/46   (2006.01)
G06K 9/62   (2006.01)

(52) U.S. Cl. .................. 382/305; 382/190; 382/209

(58) Field of Classification Search ............... 382/181, 382/190, 209, 218, 224, 305; 707/1–10, 707/705–708, 711, 713, 722–723, 736
See application file for complete search history.

(56) References Cited

U.S. PATENT DOCUMENTS

| 6,169,998 | B1 | 1/2001 | Iwasaki et al. |
| 6,678,678 | B2 * | 1/2004 | Lee et al. ................ 707/3 |
| 6,731,826 | B1 * | 5/2004 | Yamamoto et al. ......... 382/305 |
| 7,233,945 | B2 * | 6/2007 | Shiiyama .................. 707/4 |
| 7,266,224 | B2 * | 9/2007 | Sukegawa ................. 382/118 |
| 2002/0123990 | A1 * | 9/2002 | Abe et al. ................. 707/3 |

* cited by examiner

*Primary Examiner*—Daniel G Mariam
(74) *Attorney, Agent, or Firm*—Blakely, Sokoloff, Taylor & Zafman LLP

(57) ABSTRACT

A feature-amount extracting unit extracts a first feature amount of information to be registered, from the information. A searching unit searches for a second feature amount of information from a feature-amount storing unit. A similarity calculating unit calculates a similarity between the first feature amount and the second feature amount. A registering unit registers the first information in association with a similarity-information list in a similarity-information-list storing unit, which includes the second information corresponding to the second feature amount of which the calculated similarity is larger than a threshold, as similarity information.

19 Claims, 24 Drawing Sheets

FIG. 4

| IMAGE ID | SIMILARITY INFORMATION LIST (SIMILAR IMAGE ID:SIMILARITY) |
|---|---|
| 1 | 2:0.10, 10:0.11, ··· |
| 2 | 1:0.10, 3:0.11, ··· |
| 10 | 1:0.11 |

| IMAGE ID | SIMILAR IMAGE ID | SIMILARITY |
|---|---|---|
| 1 | 2 | 0.10 |
| 1 | 10 | 0.11 |
| 2 | 1 | 0.10 |
| 2 | 3 | 0.11 |

| IMAGE ID | OCCURRENCE NUMBER |
|---|---|
| 1 | 2 |
| 2 | 1 |
| 3 | 1 |
| 10 | 1 |

| IMAGE ID | IMAGE FILE NAME | KEYWORD |
|---|---|---|
| 1 | image A | LION |
| 2 | image B | LION |
| 3 | image C | FLOWER |
| 10 | image Z | LION |

2022

INFORMATION MANAGEMENT APPARATUS, INFORMATION MANAGEMENT METHOD, AND COMPUTER PROGRAM PRODUCT

PRIORITY

The present document claims priority to and incorporates by reference the entire contents of Japanese priority document, 2005-270682 filed in Japan on Sep. 16, 2005.

BACKGROUND OF THE INVENTION

1. Field of the Invention

The present invention relates to a technology for searching similar information by registering information and a feature amount in a corresponding manner and comparing feature amounts of different pieces of information.

2. Description of the Related Art

In recent years, a similar image search technology that searches for an image similar to a specific image from image database based on the specific image has been proposed and realized as a market product.

Generally, in the similar image search technology, an image feature amount, which is information representing features of an image extracted from the image, is registered with a corresponding image at the same time. When a similar image is searched for, a similarity between the feature amounts of images is determined, and an image whose similarity is associated with an image feature amount larger than a predetermined threshold is searched for as the similar image.

As for an extraction method of an image feature amount, for example, Japanese Patent Application Laid-Open No. 2000-187731 proposes a feature amount extraction technology to automatically extract a feature amount corresponding to human sense, so as to allow a search for a similar image compatible with the similar sense that human being feels.

In such a similar image search technology using an image feature amount, the image feature amount is extracted and kept at the time of image registration, and a search can be performed only with the use of the feature amount without referring to the image at the time of the search, and therefore, a search for similar image information can be performed at relatively high speed.

However, in the similar image search technology, every similarity between image feature amounts of all registered images to search for is to be calculated at the time, which causes a problem that as the number of registration images increases, the search process speed decreases.

SUMMARY OF THE INVENTION

An information management apparatus, information management method, and computer program product are described. In one embodiment, an information management apparatus comprises: a feature-amount storing unit to store information in association with a feature-amount representing contents of the information; a similarity-information-list storing unit to store the information in association with a similarity-information list that includes at least one piece of similarity information corresponding to a feature-amount of which a similarity indicating a degree of being similar to the feature-amount of the information is larger than a predetermined threshold; a feature-amount extracting unit to extract a first feature amount of first information that is target information to be registered, from the first information; a searching unit to search for a second feature amount of second information from the feature-amount storing unit; a similarity calculating unit to calculate a similarity between the first feature amount and the second feature amount; and a registering unit to register the first information in association with the similarity-information list in the similarity-information-list storing unit, the similarity-information list including the second information corresponding to the second feature amount of which the calculated similarity is larger than the threshold, as the similarity information.

BRIEF DESCRIPTION OF THE DRAWINGS

FIG. 4 is a schematic for illustrating one example of a data structure of a similarity-information-list DB shown in FIG. 1;

FIG. 5 is a schematic for illustrating another example of contents of the similarity-information-list DB shown in FIG. 1;

FIG. 21 is a schematic of one example of a data structure of an occurrence number DB shown in FIG. 20;

FIG. 22 is a schematic of one example of a data structure of a metadata DB shown in FIG. 20;

DETAILED DESCRIPTION OF THE PREFERRED EMBODIMENTS

Figure 1:
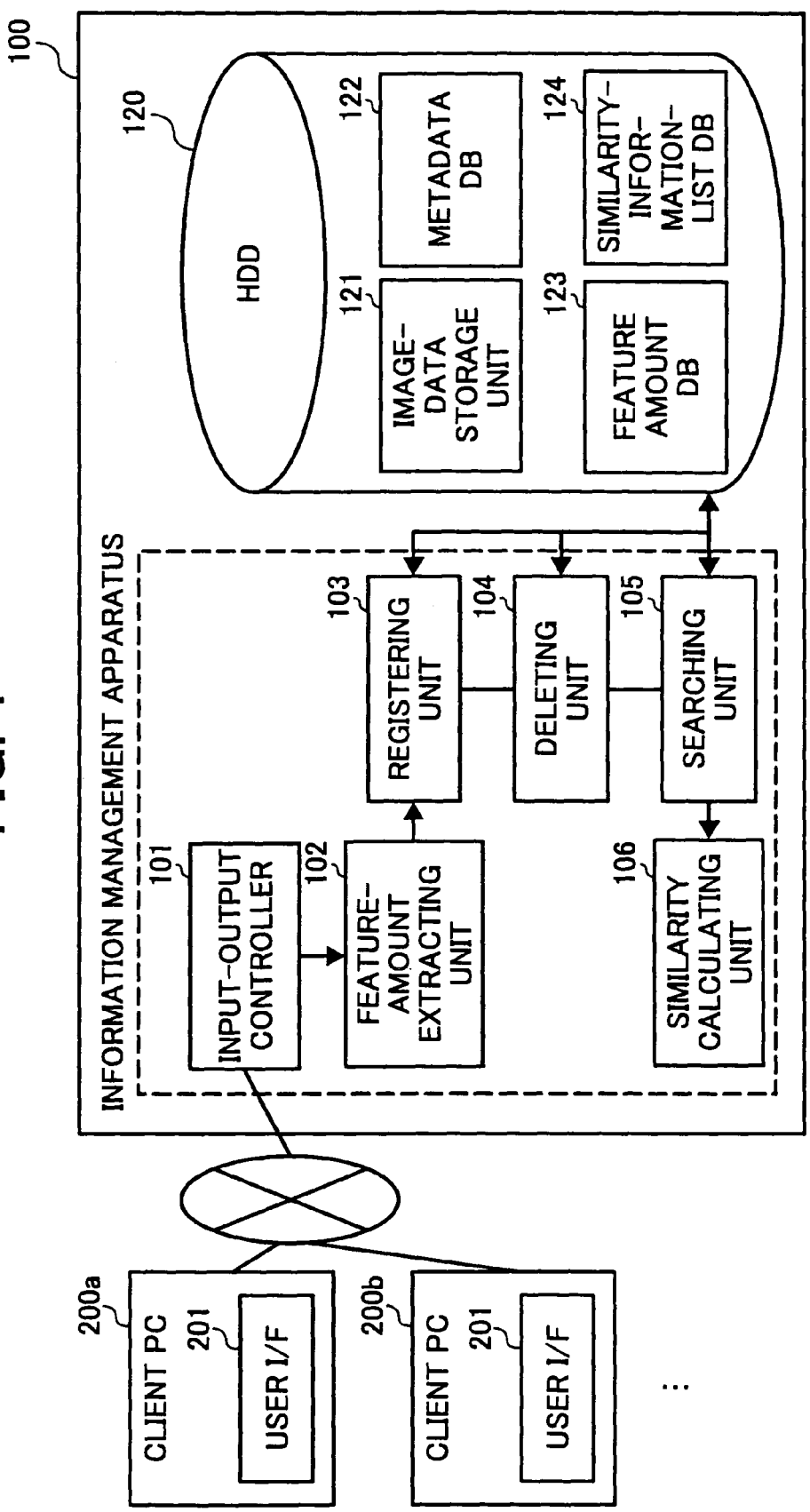
FIG. 1 is a block diagram of an information management apparatus according to a first embodiment of the present invention.

Embodiments of the present invention at least partially solve the problems in the conventional technology.

An information management apparatus according to one embodiment of the present invention includes a feature-amount storing unit that stores information in association with a feature-amount representing contents of the information; a similarity-information-list storing unit that stores the information in association with a similarity-information list that includes at least one piece of similarity information corresponding to a feature-amount of which a similarity indicating a degree of being similar to the feature-amount of the information is larger than a predetermined threshold; a feature-amount extracting unit that extracts a first feature amount of first information that is target information to be registered, from the first information; a searching unit that searches for a second feature amount of second information from the feature-amount storing unit; a similarity calculating unit that calculates a similarity between the first feature amount and the second feature amount; and a registering unit that registers the first information in association with the similarity-information list in the similarity-information-list storing unit, which includes the second information corresponding to the second feature amount of which the calculated similarity is larger than the threshold, as the similarity information.

An information management method according to another embodiment of the present invention includes extracting a first feature amount of first information that is target information to be registered, from the first information; searching for a second feature amount of second information from a feature-amount storing unit that stores information in association with a feature-amount representing contents of the information; calculating a similarity between the first feature amount and the second feature amount, which indicates a degree of being similar to the feature-amount of the information; and registering the first information in association with a similarity-information list in a similarity-information-list storing unit, which includes the second information corresponding to the second feature amount of which the calculated similarity is larger than the threshold, as the similarity information.

A computer program product according to still another aspect of the present invention includes a computer usable medium having computer readable program codes embodied in the medium that when executed causes a computer to execute a method comprising: extracting a first feature amount of first information that is target information to be registered, from the first information; searching for a second feature amount of second information from a feature-amount storing unit that stores information in association with a feature-amount representing contents of the information; calculating a similarity between the first feature amount and the second feature amount, which indicates a degree of being similar to the feature-amount of the information; and registering the first information in association with a similarity-information list in a similarity-information-list storing unit, which includes the second information corresponding to the second feature amount of which the calculated similarity is larger than the threshold, as the similarity information.

The above and other objects, features, advantages and technical and industrial significance of this invention will be better understood by reading the following detailed description of presently preferred embodiments of the invention, when considered in connection with the accompanying drawings.

Exemplary embodiments of the present invention will be explained in detail with reference to the accompanying drawings.

An information management apparatus according to a first embodiment of the present invention searches for similarity information when information is registered and registers a result of the search in a memory as a similarity-information-list. When similarity information of arbitrary information is to be searched for, the similarity information is acquired from the similarity-information list having been registered and output as a search result.

Hereinafter, an example where the present invention is applied to a similar image search process in which image information is registered as information and an image similar to the image information is searched for is explained. The information handled is not limited to image information, but any information may be targeted as long as similarity information is searched for by comparing feature amounts after information and a feature amount representing the contents of the information are associated with each other and registered. For example, the information management apparatus may be configured such that the present invention is applied to management of analysis data and the like output after analyzing, for example, document data, voice data, animation data, and information.

FIG. 1 is a block diagram of an information management apparatus 100 according to the first embodiment. The information management apparatus 100 is connected via network such as Internet to a plurality of client personal computers (PCs) 200a and 200b (hereinafter, "client PC"), respectively, provided with a user interface (I/F) 201, respectively, on which search conditions are input and search results are displayed. The network is not limited to Internet and can be configured with any network mode that is commonly utilized.

The information management apparatus 100 is provided with a hard disk drive (HDD) 120 as main hardware. As main software components, an input/output (I/O) controller 101, a feature-amount extracting unit 102, a registering unit 103, a deleting unit 104, a searching unit 105, and a similarity calculating unit 106 are provided.

The HDD 120 is a memory in which an image-data storage unit 121, a metadata data base (DB) 122, a feature-amount DB 123, and a similarity-information-list DB 124 are stored. The memory is not limited to HDD and can be composed of any memory such as optical disk and memory card that are commonly utilized.

The image-data storage unit 121 is a storage unit to store image data. As the method to store, any method such as a method to store on file system provided by operating system (OS) and a method to store in image database in which image data is stored can be applied.

Figure 2:
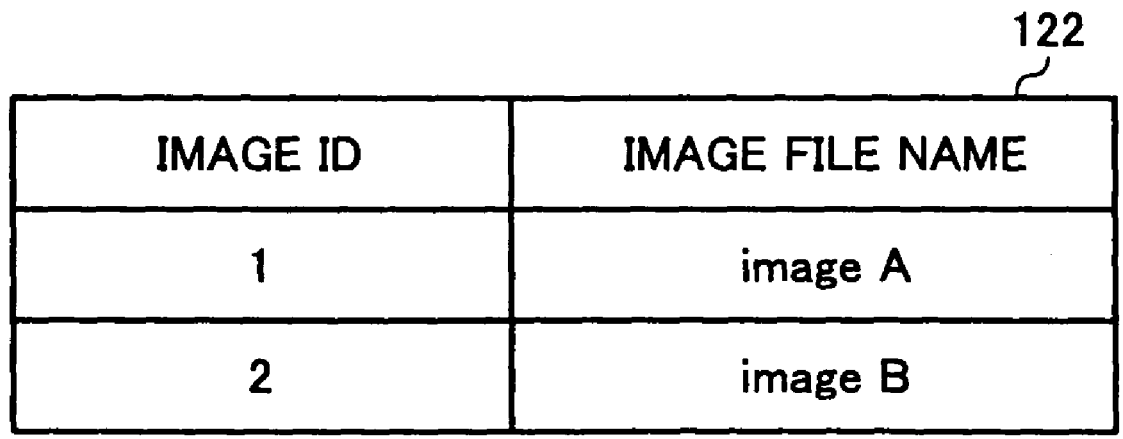
FIG. 2 is a schematic for illustrating one example of a data structure of a metadata database (DB) shown in FIG. 1.

The metadata DB 122 is a storage unit to store metadata representing attributes of image data. FIG. 2 is a detailed diagram to explain one example of data structure of the metadata DB 122. As shown in the figure, image ID and image-file name representing one example of metadata of image data are associated with each other and stored in the metadata DB 122.

The metadata is not limited to image-file name, and any information can be stored as metadata as long as the information represents attributes of image data.

Image-file name is used to identify where in the image-data-storage unit 121 an image is kept. The metadata CB 122 may be configured such that image data is stored in an outside system and image-file name includes information that identifies the outside system. For example, the metadata DB 122 may be configured such that image data is kept in an outside server on the Internet and the image information kept in the outside system can be managed by showing the image-file name with a uniform resource locator (URL).

Figure 3:
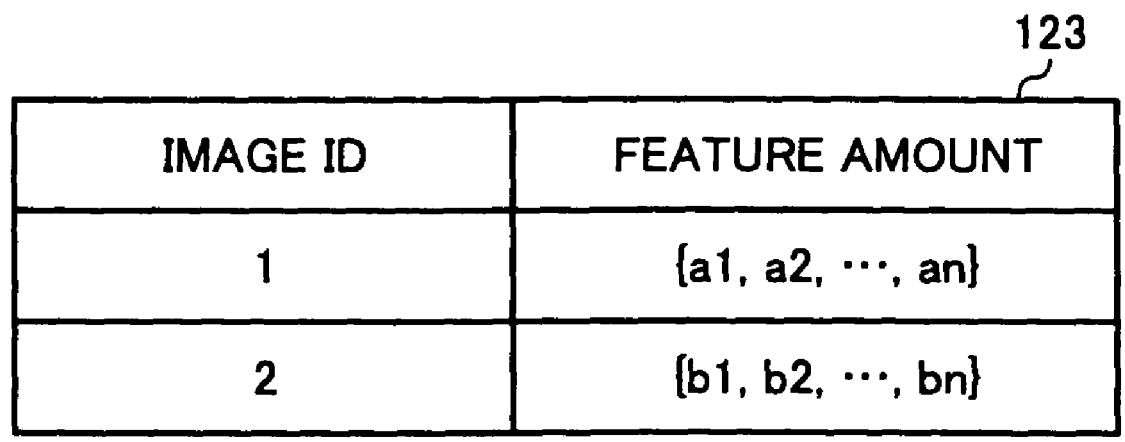
FIG. 3 is a schematic for illustrating one example of a data structure of a feature-amount DB shown in FIG. 1.

The feature-amount DB 123 is a storage unit that stores feature amount of image stored in the image-data storage unit 121. FIG. 3 is a detailed diagram to explain one example of a data structure of the feature-amount DB 123. As shown in the figure, image ID and image feature amount are associated with each other and stored in the feature-amount DB 123.

For image feature amount, for example, vector data such as color histogram of image can be utilized. In FIG. 3, an example in which vector data of an image feature amount identified by an image ID=1 is represented by $[a_1, a_2, \ldots, a_n]$ and another vector data of an image feature amount identified by an image ID=2 is represented by $[b_1, b_2, \ldots, b_n]$ is shown (where n is an integer). As image-feature amount, all feature amounts commonly used such as color, color distribution, composition, and pattern can be kept.

The similarity-information-list DB 124 is a database in which similarity information that feature amounts are determined similar with respect to each image stored in the image-data storage unit 121 is stored. FIG. 4 is a detailed diagram to illustrate one example of a data structure of the similarity-information-list DB 124. As shown in the figure, image ID and similarity-information list including at least one set of a similar-image ID that is an image ID of a similar image and a similarity are associated with each other and stored in the similarity-information-list DB 124.

FIG. 5 is a detailed diagram to illustrate another example of the data structure of the similarity-information-list DB 124. In the example shown in the figure, image ID, similar-image ID, and similarity are associated with one another and stored in the similarity-information-list DB 124. Even though the similarity-information-list DB 124 is configured like this, it can store a plurality of pieces of similarity information with respect to one image.

In this case, the information including at least one set of a similar-image ID and a similarity that have been associated with an identical image ID corresponds to the similarity-information list of the present invention. For example, in the example shown in FIG. 5, the similarity-information list associated with the image ID=1 is information including two sets of similar-image ID and similarity, a set of 2 and 0.10 and a set of 10 and 0.11.

Similarity information is registered in the similarity-information-list DB 124 in advance, and therefore, a search for similarity information by calculating the similarity of a feature amount at the time of the search becomes unnecessary, which makes it possible to realize speed-up of a search process.

The I/O controller 101 controls a process to input registration of and search for an image that is directed by a user through the client PC and a process to output search result to the client PC.

The feature-amount extracting unit 102 reads image data to register and extracts a feature amount of the image data. As the method to extract feature amount, any method conventionally used such as the method disclosed in Japanese Patent Application Laid-Open No. 2000-187731 that extracts color histogram as feature amount can be applied.

The registering unit 103 performs a data registration process for the image-data storage unit 121, the metadata DB 122, and the feature-amount DB 123.

Further, the registering unit 103 performs a process in which a similarity-information list including information, as similarity information, whose similarity of a feature amount calculated by the similarity calculating unit 106 described later is associated with a feature amount larger than a predetermined threshold is created and the created similarity-information list and information to register are associated with each other and registered in the similarity-information-list DB 124.

Furthermore, the registering unit 103 performs an update process in which the similarity-information list associated with the similarity information of the information to be registered is acquired from the similarity-information-list DB 124 and the information to register is added to the acquired similarity-information list as similarity information, followed by the similarity-information-list DB 124 being updated.

The deleting unit 104 performs a process to delete data from the image-data storage unit 121, the metadata DB 122, and the feature-amount DB 123.

Further, the deleting unit 104 performs a process at the time of deletion of registered information, in which a similarity-information list with the information to be deleted being associated with similarity information is acquired from the similarity-information-list DB 124 and the information to be deleted is deleted from the acquired similarity-information list to remake the similarity-information list, followed by the similarity-information-list DB 124 being updated. Accordingly, data inconsistency that deleted information remains as similarity information with respect to information not being deleted can be avoided.

The searching unit 105 performs a process in which data is searched from the image-data storage unit 121, the metadata DB 122, and the feature-amount DB 123.

Further, the searching unit 105 performs a process in which, when a user directs a search for similarity information, a similarity-information list associated with the information for which the user directed to search is acquired from the similarity-information-list DB 124 and similarity information included in the acquired similarity-information list is output as a search result. Accordingly, a process in which feature amounts are compared at the time of searching for similarity information and similarities are calculates becomes unnecessary, thereby making it possible to realize speed-up of the search process.

The similarity calculating unit 106 compares a feature amount of information to register that is extracted by the feature-amount extracting unit 102 with a feature amount of information that has already been registered in the feature-amount DB and calculates a similarity that represents a degree of similarity between them.

For example, the similarity calculating unit 106 calculates a similarity S by the formula (1) below, where vector data of a feature amount to be compared is represented by $\{a_1, a_2, \ldots, a_n\}$ and $\{b_1, b_2, \ldots, b_n\}$.

$$S = \Sigma |a_i - b_i| \tag{1}$$

The similarity S is calculated by summation of absolute values of the differences between individual elements of vector data of feature amounts. Therefore, as the similarity S is smaller, both are more similar to each other. Thus, when a similarity is determined by the registering unit 103, for example, an inverse of the similarity S (hereinafter, "similarity") is calculated, and when the inverse is larger than a predetermined threshold, it is determined that both are similar to each other.

The registering unit 103 may be adapted such that the registering unit 103 determines whether a similarity is smaller than a predetermined threshold without calculating an inverse, thereby determining the similarity of information. The threshold is set, for example, from 0.3 to 0.4 when the range of a similarity is from 0 to 1, and when a similarity is smaller than the threshold, it is determined that two feature amounts are similar to each other.

Each element of vector data is generally represented in the form of floating-point. Further, since vector data is generally in a size of 1.5 kilobytes to 2.0 kilobytes, the similar calculation process represented by the formula (1) becomes a computation process under high load.

Figure 6:
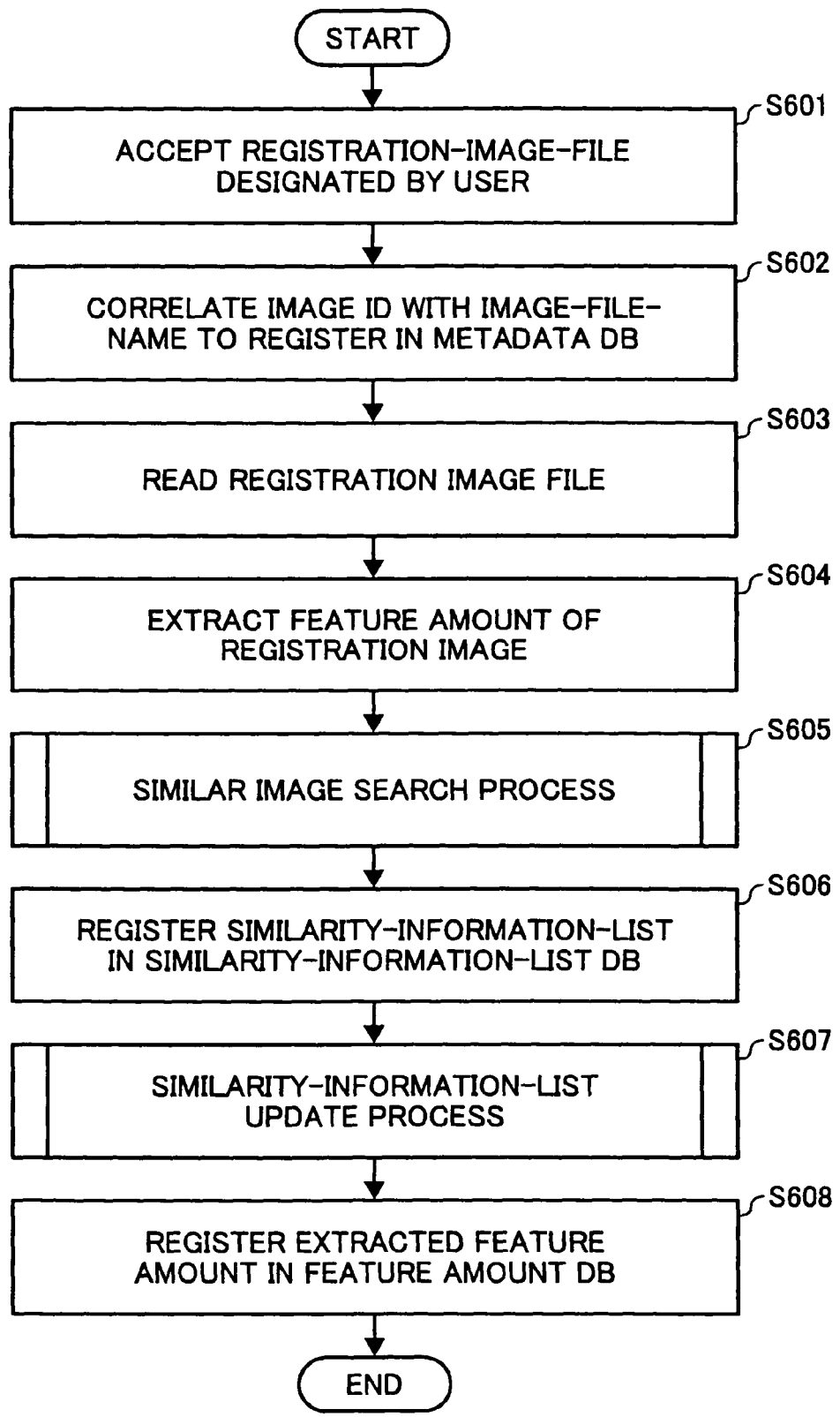
FIG. 6 is a flowchart of a registration process according to the first embodiment.

Registration process for information performed by the information management apparatus 100, configured as described above, according to the first embodiment is explained. FIG. 6 is a flowchart that represents the whole flow of a registration process according to the first embodiment.

First, the I/O controller 101 accepts a user's designation of a registration-image file input on the user I/F 201 of the client PC (step S601). The registering unit 103 correlates an image ID with an image-file name to register in the metadata DB 122 (step S602).

The feature-amount extracting unit 102 reads the registration-image-file (step S603) and extracts a feature amount of the registration image (step S604). The extracted feature amount is output as vector data as described above.

A similar image search process in which a similar image of the image to register is searched for is performed (step S605). In the similar image search process, information on the searched similar image is output to a similarity-information-list. The detailed similar image search process will be described later.

The registering unit 103 registers the similarity-information list output in the similar image search process in the similarity-information-list DB 124 (step S606).

Subsequently, a similarity-information-list update process is performed to add the information to register as similarity information of information that has already been registered (step S607). The detailed similarity-information-list update process will be described later.

The registering unit 103 registers the feature amount extracted by the feature-amount extracting unit 102 at the step S604 in the feature-amount DB 123 (step S608), thus terminating the registration process.

In this way, the similarity information of the information to register is searched for at the steps S605 and S606 and is registered in the similarity-information-list DB 124 in advance, and therefore, a search result can be obtained only by acquiring similarity information that has already been registered from the similarity-information-list DB 124 at the time of the search process. Thus, it is possible to realize a speed-up of the search process. The detailed search process will be described later.

In the example, the similarity information is searched for at the same time as registration of the image information and registered in the similarity-information-list DB 124. However, search and registration processes of the similarity information may be performed after completing the registration of the image information if it is before performing the search process. Owing to this, a feature-amount extraction process with high processing load and a similarity calculation process can be performed independently.

Figure 7:
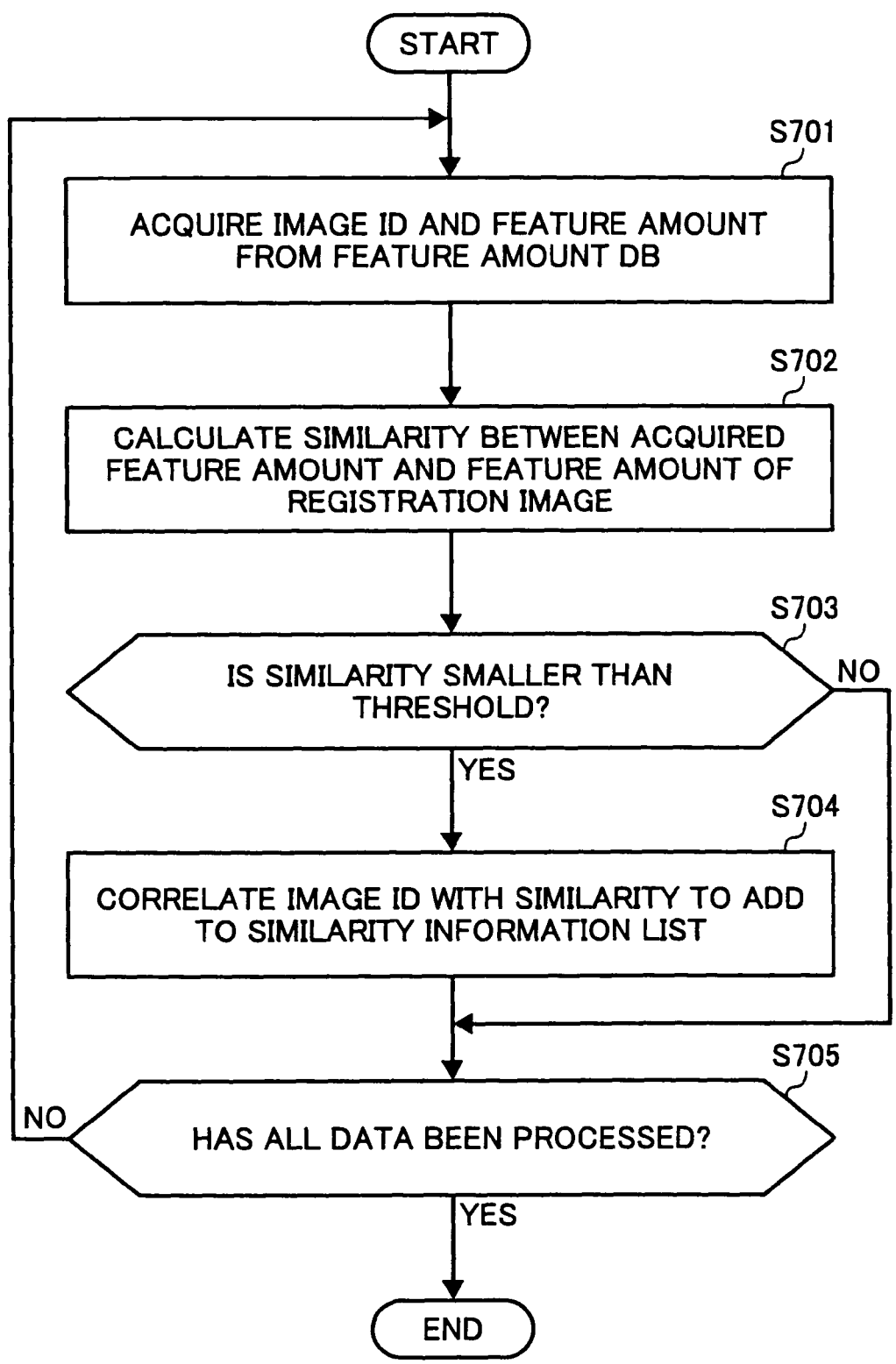
FIG. 7 is a detailed flowchart of a similar image search process shown in FIG. 6.

The detailed similar image search process shown at the step S605 is explained. FIG. 7 is a flowchart that represents the whole flow of the similar image search process according to the first embodiment.

First, the searching unit 105 acquires an image ID and a feature amount from the feature-amount DB 123 (step S701). Next, the similarity calculating unit 106 calculates a similarity between the acquired feature amount and the feature amount of the registration image extracted by the feature-amount extracting unit 102 at the step S604 (step S702). Here, the similarity S is assumed to be calculated by the formula (1) meaning that as the value is smaller, both are more similar to each other as described above.

Next, the similarity calculating unit 106 determines whether the similarity is smaller than a predetermined threshold (step S703). This means that the similarity calculating unit 106 determines whether the image information searched for from the feature-amount DB is similar to the image information to register.

When the similarity is smaller than the predetermined threshold (YES at the step S703), it can be determined that the image information searched for from the feature-amount DB is similar to the image information to register. Therefore, the image ID acquired at the step S701 is designated as a similar-image ID and associated with the similarity calculated at the step S702, followed by adding it to the similarity-information list (step S704).

After the addition to the similarity-information-list, or when the similarity is determined not to be smaller than the predetermined threshold at the step S703 (NO at the step S703), the searching unit 105 determines whether all data in the feature-amount DB 123 has been processed (step S705).

When not all the data has been processed (NO at the step S705), a next image data is acquired to repeat the process (the step S701). When all the data has been processed (YES at the step S705), the similar image search process is terminated.

The similarity-information-list update process shown at the step S607 is explained in detail. The image information newly registered and the similarity information corresponding thereto (existing information) are information similar to each other. Therefore, the image information newly registered is necessary to add to the similarity-information list on the existing information. This process is performed in the similarity-information-list update process.

Figure 8:
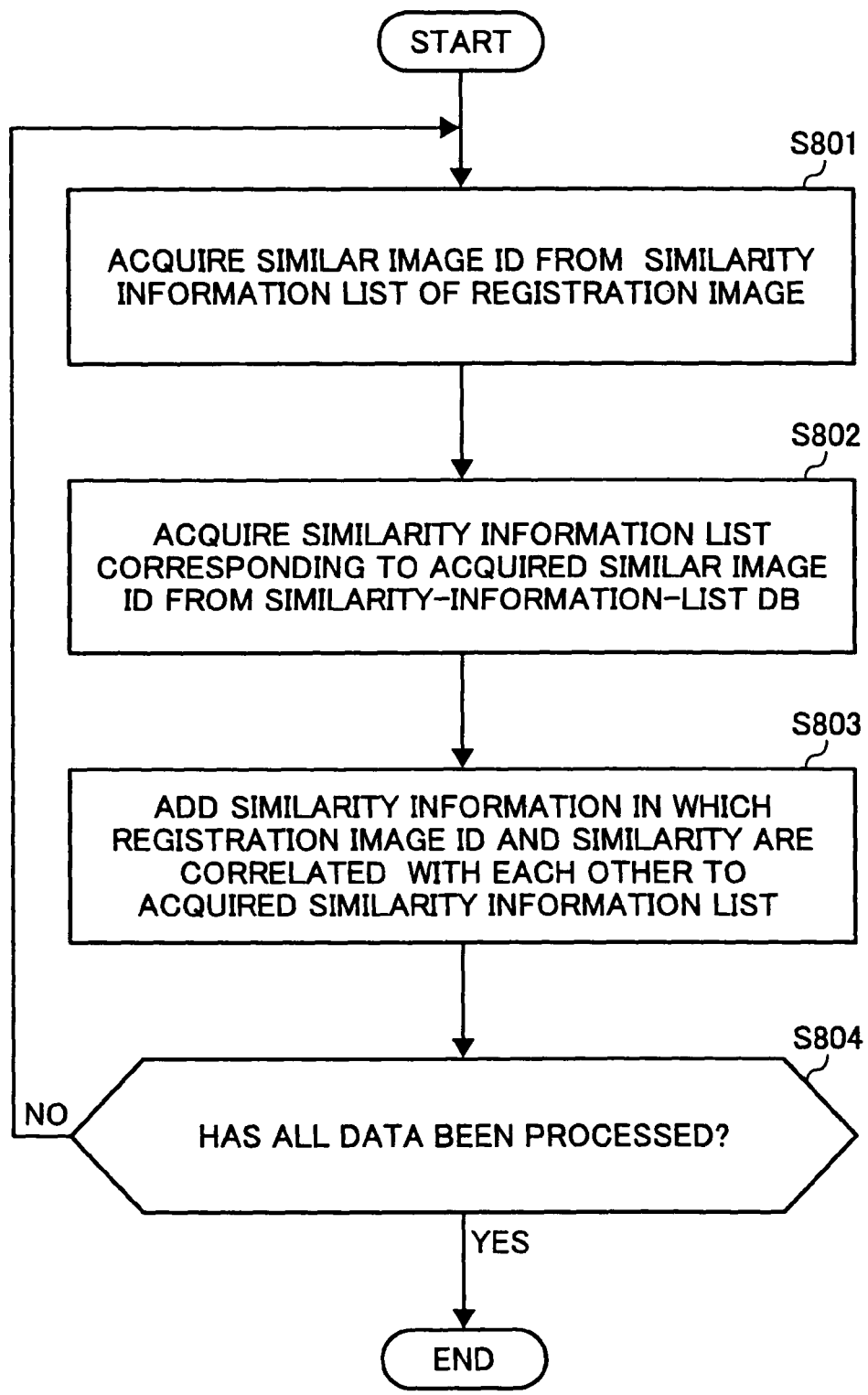
FIG. 8 is a detailed flowchart of a similarity-information-list update process shown in FIG. 6.

FIG. 8 is a flowchart that represents the whole flow of the similarity-information-list update process according to the first embodiment.

First, the searching unit 105 acquires a similar-image ID from the similarity-information list of the registration image (step S801). Next, the searching unit 105 acquires a similarity-information list corresponding to the acquired similar-image ID from the similarity-information-list DB 124 (step S802).

Next, the registering unit 103 adds the similarity information, which the image ID of the image to register is associated with the similarity calculated by the similarity calculating unit 106 at the step S702, to the acquired similarity-information list (step S803).

For example, assume that an image ID of registration image is designated as 10 (image ID=10) and that "1" is acquired as a similar-image ID from the similarity-information list ("1:0.11") as shown in FIG. 4 (the step S801). Further, assume that "2:0.10, . . . ,", for example, is acquired as a similarity-information list corresponding to the acquired similar-image ID (the step S802). At the step S803, the similarity information "10:0.11" that the image ID (10) of registration image and the similarity (0.11) are associated with each other is added to this similarity-information list. As the result, the similarity-information list is updated to the similarity-information list "2:0.10, 10:0.11, . . . " as shown in the column of image ID=1 in FIG. 4.

Next, the searching unit 105 determines whether all data in the similarity-information list of the registration image has been processed (step S804), and when not all the data has been processed (NO at the step S804), a next similar-image ID is acquired to repeat the process (the step S801).

When all the data has been processed (YES at the step S804), the similarity-information-list update process is terminated.

A search process for similarity information performed by the information management apparatus 100 configured as described above according to the first embodiment is explained. The search process here is a process directed by a user and means a process in which a similar image with respect to a specific image is searched for.

Figure 9:
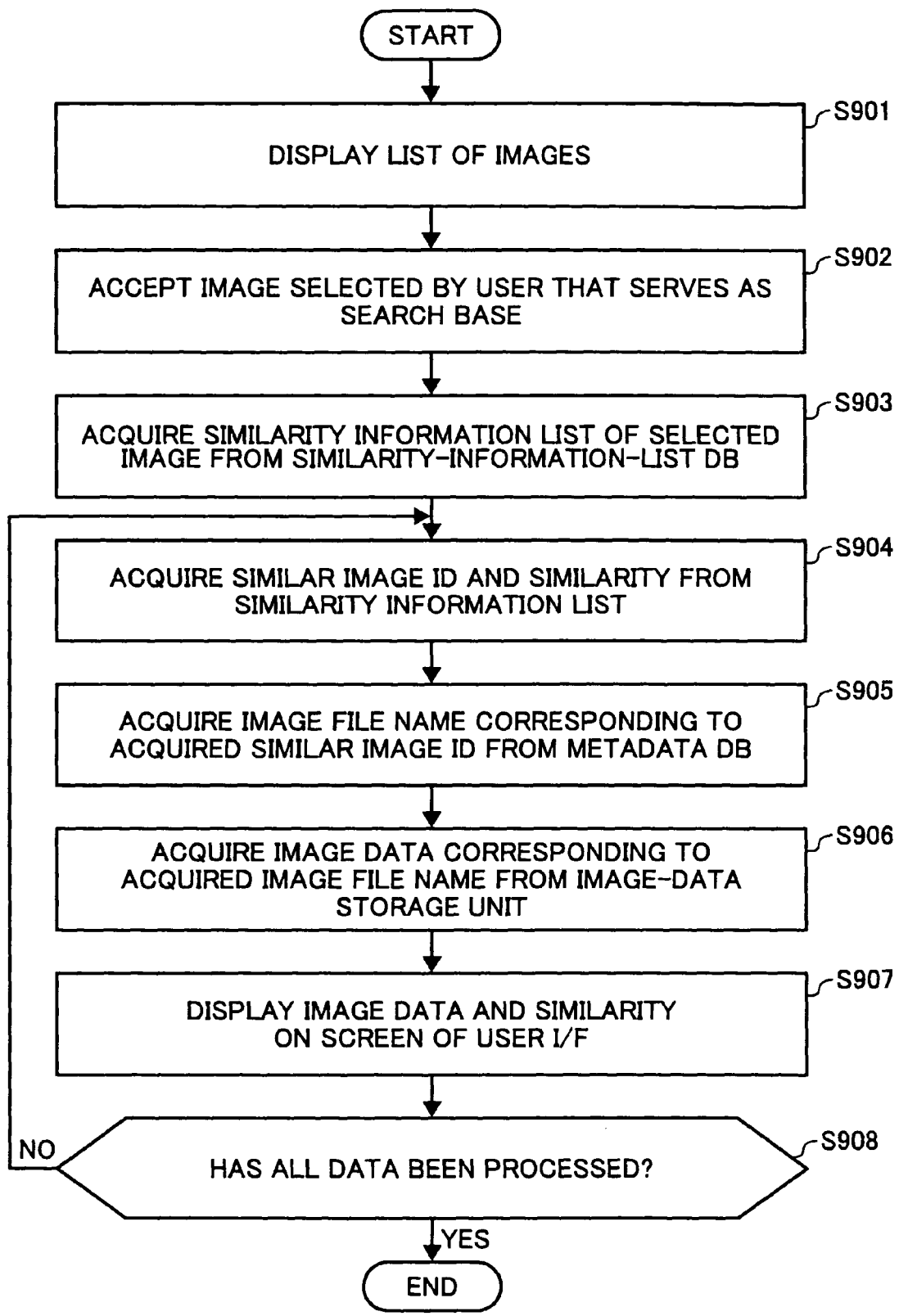
FIG. 9 is a flowchart of a search process according to the first embodiment.

FIG. 9 is a flowchart that represents the whole flow of the search process according to the first embodiment. First, the I/O controller 101 displays a list of images stored in the image-data storage unit 121 as a precondition of a search (step S901) and accepts the selection, by a user, of an image that serves as a search base (step S902).

The image list may be adapted to display in the order of registration date or frequency of use, or may be adapted to display images extracted randomly. Further, metadata registered in the metadata DB 122 is first searched for images, and searched images may be displayed in the list.

Next, the searching unit 105 acquires a similarity-information list of the image selected by the user from the similarity-information-list DB 124 (step S903).

Subsequently, the searching unit 105 acquires a similar-image ID and a similarity from the acquired similarity-information list (step S904). Next, the searching unit 105 acquires an image-file name corresponding to the acquired similar-image ID from the metadata DB 122 (step S905).

Further, the searching unit 105 acquires an image data corresponding to the acquired image-file name from the image-data storage unit 121 (step S906). When image data is kept in an outside system, the searching unit 105 acquires the image data corresponding to the image-file name from the outside system.

Next, the I/O controller 101 displays the acquired image data and similarity on the screen of the user I/F 201 of the client PC (step S907).

Next, the searching unit 105 determines whether all data on the similarity-information list has been processed (step S908), and when not all the data has been processed (NO at the step S908), the searching unit 105 acquires a next similar-image ID to repeat the process (the step S904).

When all the data has been processed (YES at the step S908), the search process is terminated.

In this way, in the searching process, similarity information in a similarity-information list that has already been registered in the similarity-information-list DB 124 can be output as similarity information of the image of search base. Accordingly, speed-up of the search process can be realized.

A deletion process for information performed by the information management apparatus 100 configured as described above according to the first embodiment is explained. In the deletion process, not only is image information deleted but also a similarity-information list in which the information to be deleted is registered as similarity information is searched for and the information to be deleted from the similarity-information list is deleted, thereby allowing to maintain the consistency of the similarity-information list.

Figure 10:
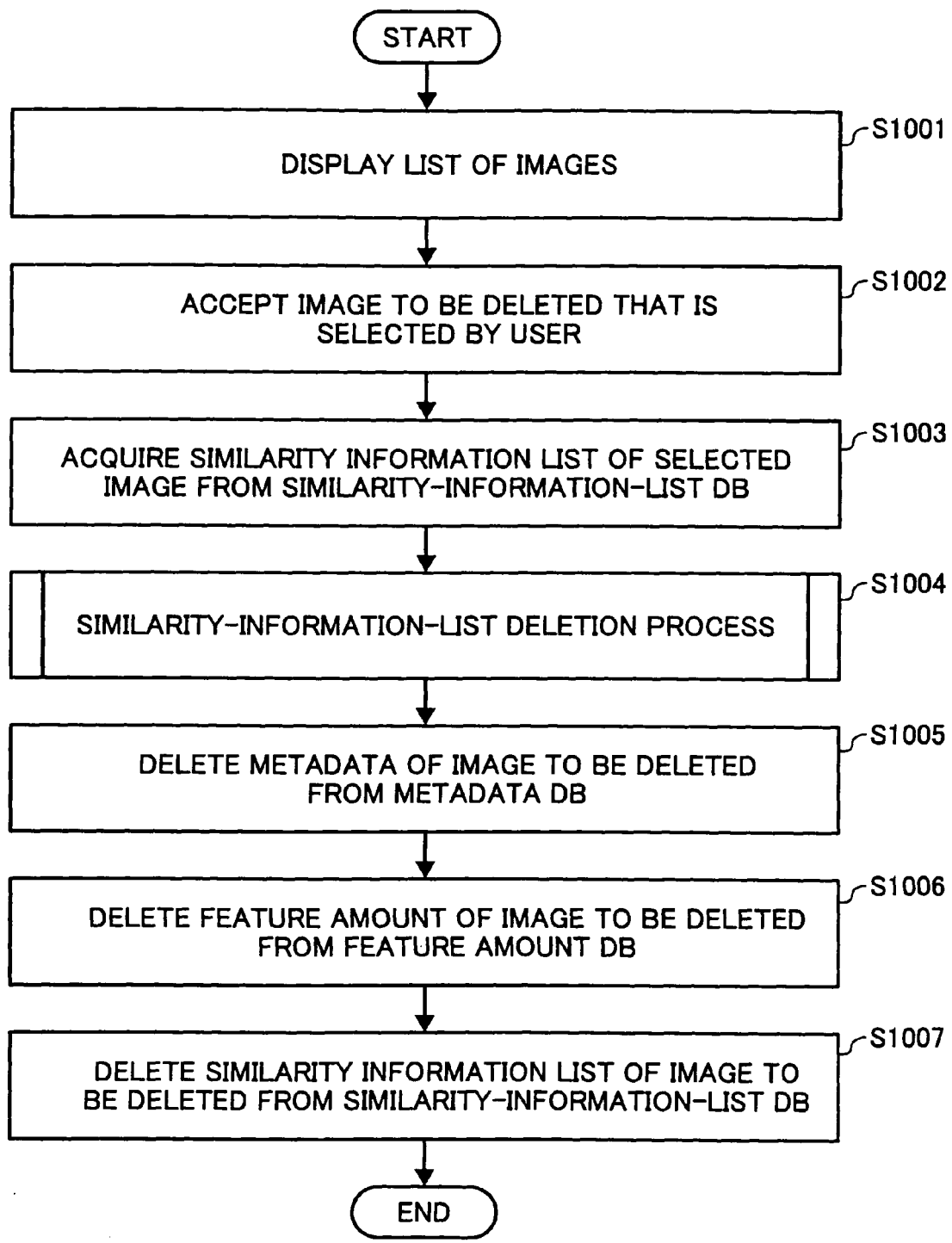
FIG. 10 is a flowchart of a deletion process according to the first embodiment.

FIG. 10 is a flowchart that represents the whole flow of the deletion process according to the first embodiment. First, the I/O controller 101 displays a list of image stored in the image-data storage unit 121 as the precondition of deletion (step S1001) and accepts an image to be deleted that is selected by a user (step S1002).

Next, the searching unit 105 acquires a similarity-information list of the image selected by the user from the similarity-information-list DB 124 (step S1003).

Subsequently, the searching unit 105 performs a similarity-information-list deletion process (step S1004). The similarity-information-list deletion process will be described later in detail.

Next, the deleting unit 104 deletes the metadata of the image to be deleted from the metadata DB 122 (step S1005), the feature amount of the image to be deleted from the feature-amount DB 123 (step S1006), and the similarity-information list of the image to be deleted from the similarity-information-list DB 124 (step S1007), thus terminating the deletion process.

Figure 11:
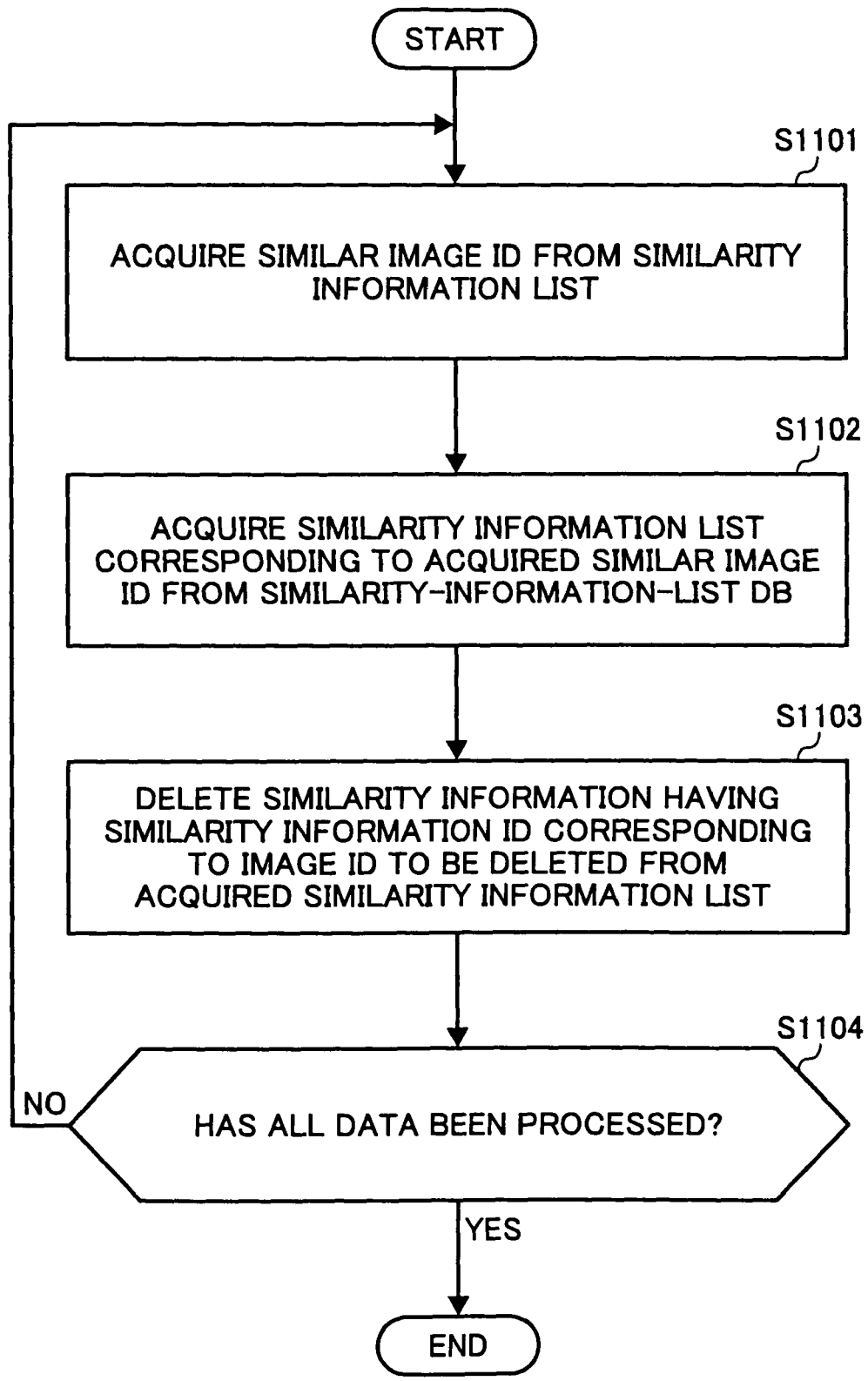
FIG. 11 a detailed flowchart of a similarity-information-list deletion process according to the first embodiment.

The similarity-information-list deletion process shown at the step S1004 is explained in detail. FIG. 11 is a flowchart that represents the whole flow of the similarity-information-list deletion process according to the first embodiment. The searching unit 105 acquires a similar-image ID from the similarity-information-list (step S1101). The searching unit 105 acquires a similarity-information-list corresponding to the acquired similar-image ID from the similarity-information-list DB 124 (step S1102).

The deleting unit 104 deletes similarity information having a similarity information ID corresponding to the image ID to be deleted from the acquired similarity-information list (step S1103).

The searching unit 105 determines whether all data in the similarity-information list of the image to be deleted has been processed (step S1104), and when not all the data has been processed (NO at the step S1104), a next similar-image ID is acquired to repeat the process (the step S1101).

When all the data has been processed (YES at the step S1104), the similarity-information-list deletion process is terminated.

In this way, in the information management apparatus 100 according to the first embodiment, at the time of registration of information, similarity information is searched for and the search result can be registered in the memory as a similarity-information list. Further, when similarity information of arbitrary information is searched for, the similarity information is acquired from a similarity-information list that has already been registered and can be output as a search result. Owing to this, even when the number of pieces of image information having been registered is large, speed-up of the search process can be realized.

When registered information is deleted, not only is the registered information merely deleted but also the information to be deleted can be deleted from the similarity-information list that has the information to be deleted as similarity information, thereby allowing the consistency in the similarity-information list to be maintained.

According to the first embodiment, a speed-up of a search process is realized by searching for similarity information and registering it in advance at the time of registration of image information. However, since the search is performed at the time of registration, there is a problem that processing load of registration process increases. Particularly, when an index is not used at the time of search for feature amount, it is necessary to calculate similarities to all feature amounts.

Therefore, the speed of the search process during registration process becomes markedly slow.

Hence, an information management apparatus according to a second embodiment of the present invention realizes a speed-up of a registration process by performing the registration process concurrently.

At this time, when more than a predetermined number of pieces of information are registered, they are collectively registered, and therefore, exclusive processes that are required when search and registration are performed concurrently can be minimized and a high-speed and efficient registration process can be performed.

Figure 12:
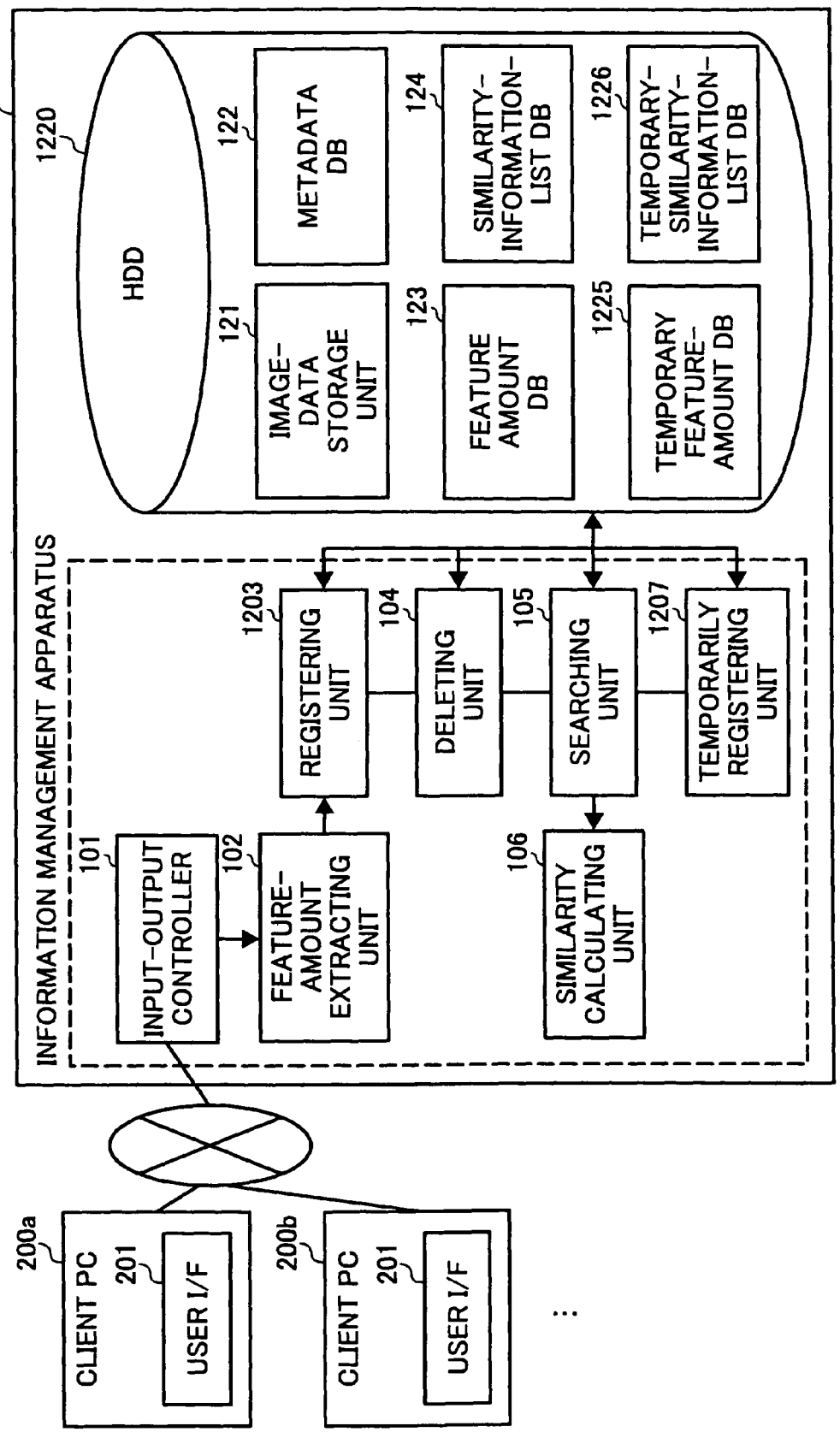
FIG. 12 is a block diagram of an information management apparatus according to a second embodiment of the present invention.

FIG. 12 is a block diagram of an information management apparatus 1200 according to the second embodiment. As shown in the figure, the information management apparatus 1200 is provided with a HDD 1220 as main hardware. As main software structure, the I/O controller 101, the feature-amount extracting unit 102, a registering unit 1203, the deleting unit 104, the searching unit 105, the similarity calculating unit 106, and a temporarily registering unit 1207 are provided.

According to the second embodiment, the difference from the first embodiment is that a temporary-feature-amount DB 1225 and a temporary-similarity-information-list DB 1226 are added to the HDD. Further, other differences from the first embodiment include that the temporarily registering unit 1207 is added and the function of the registering unit 1203 is different. Other components and functions are similar to those of the block diagram of FIG. 1 representing the information management apparatus 100 according to the first embodiment, and therefore, like components are designated by like reference numbers, and their explanation is abbreviated here.

The temporary-feature-amount DB 1225 is a storage unit that temporarily stores feature amount of image to register, and its data structure is similar to that of the feature-amount DB 123. The temporary-feature-amount DB 1225 is accessed when the temporarily registering unit 1207 described later temporarily registers a feature amount calculated in a concurrent process and then the registering unit 1203 moves the feature amount to the feature-amount DB 123.

In the temporary-similarity-information-list DB 1226, similarity information of image to register is stored, and its data structure is similar to that of the similarity-information-list DB 124. The temporary similarity-information-list DB 1226 is accessed when the temporarily registering unit 1207 described later temporarily registers a similarity-information list searched for in the concurrent process and then the registering unit 1203 moves the similarity-information list to the similarity-information-list DB 124.

The temporarily registering unit 1207 concurrently performs a process in which a similarity-information-list including information, as similarity information, whose similarity of a feature amount calculated by the similarity calculating unit 106 is associated with a feature amount larger than a predetermined threshold is created and the created similarity-information list and the information to register are correlated and registered in the temporary similarity-information-list DB 1226.

To perform concurrent processes, any methods commonly utilized such as a method to concurrently perform processes on a plurality of CPUs and a multithreaded method that one CPU is shared through a plurality of threads can be applied.

The registering unit 1203 performs a registration process for data with respect to the image-data storage unit 121, the metadata DB 122, and the feature-amount DB 123.

Further, the registering unit 1203 moves information in the temporary similarity-information-list DB 1226 to the similarity-information-list DB 124 when more pieces of information than a predetermined number are registered by the temporarily registering unit 1207 in the temporary similarity-information-list DB 1226.

Figure 13:
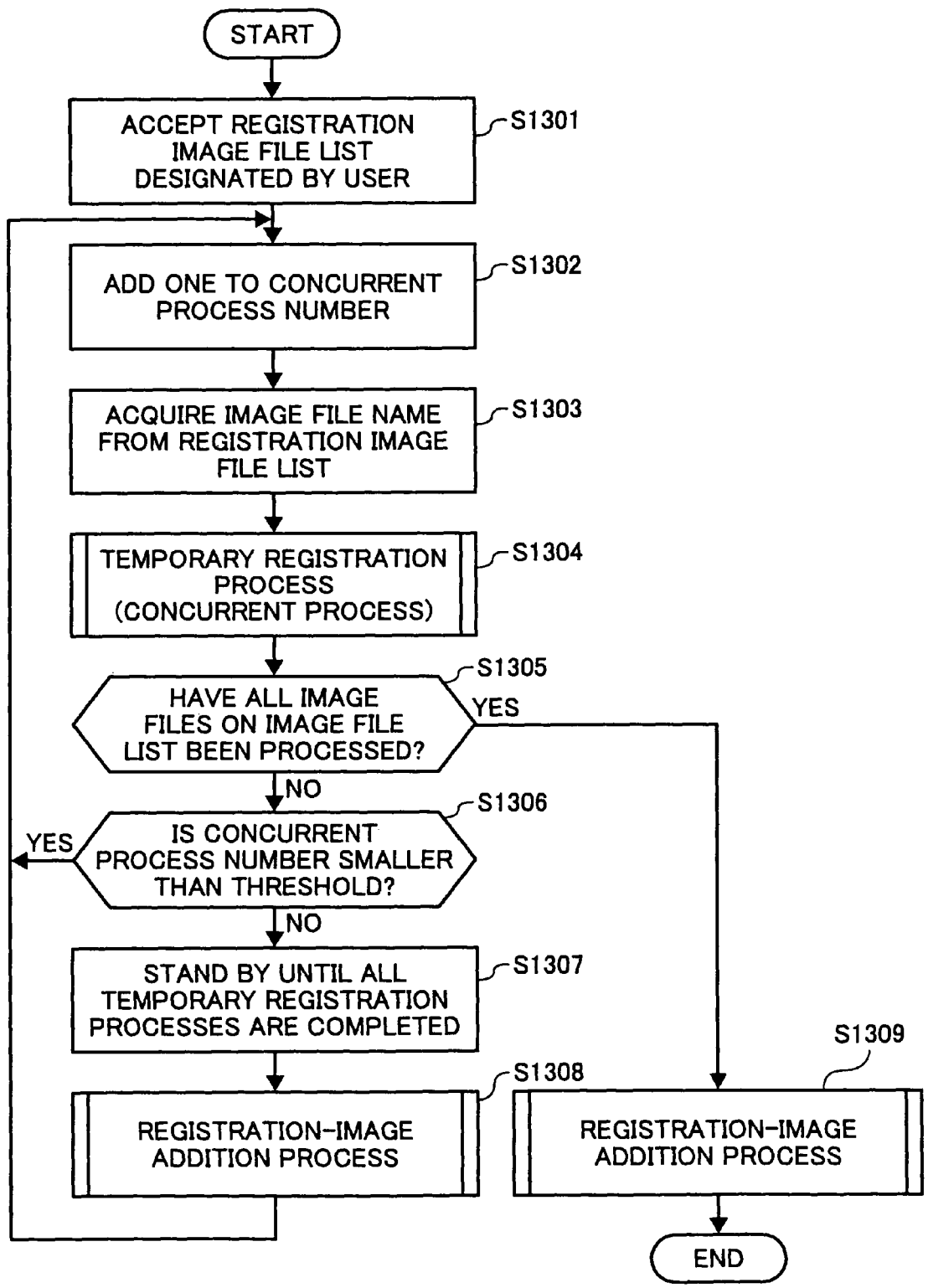
FIG. 13 is a flowchart of a registration process according to the second embodiment.

A registration process for information performed by the information management apparatus 1200 configured as described above according to the second embodiment is explained next. FIG. 13 is a flowchart that represents the whole flow of the registration process according to the second embodiment.

The I/O controller 101 accepts a registration-image-file list designated by a user (step S1301). Here, the registration-image-file list means information in which a plurality of image files to be registered is written. In this way, the second embodiment is based on the precondition that a plurality of image files is collectively registered.

Next, the registering unit 1203 adds one to the concurrent process number that is a number in performing concurrent processes (step S1302). Subsequently, the registering unit 1203 acquires one image-file name from the registration-image-file list (step S1303).

Next, a temporary registration process in which extraction of feature amount and a search for similarity information are performed concurrently with respect to the acquired image file is performed (step S1304). The temporary registration process will be described later in detail.

After performing the temporary registration process, the registering unit 1203 determines whether all image files on the image file list have been processed (step S1305). When all the image files have been processed (YES at the step S1305), a registration-image-addition process is performed where all of the feature amounts and the similarity-information lists of image information that have already been temporarily registered so far are moved to the feature-amount DB 123 and the similarity-information-list DB 124, respectively (step S1309). The registration-image-addition process will be described later in detail.

When not all the image files have been processed (NO at the step S1305), the registering unit 1203 determines whether the concurrent process number is smaller than a predetermined threshold (step S1306). The threshold here is used to determine a number in which processes can be concurrently performed, and for example, the threshold is determined depending on the number of CPUs that perform concurrent processes or the number of processes that can be processed through multithreads.

When the concurrent process number is smaller than the predetermined threshold (YES at the step S1306), an additional temporary registration process can be concurrently performed. Therefore, processing returns to the concurrent process number addition process and the process is repeated (the step S1302).

When the concurrent process number is not smaller than the predetermined threshold (NO at the step S1306), it is determined that the concurrent process number has exceed the maximum processable concurrent process number, and therefore, the registering unit 1203 stands by until all temporary registration processes are completed (step S1307) and then performs a registration-image-addition process (step S1308).

After the registration-image-addition process has been performed at the step S1308, image files that have not been processed yet exist, and therefore, processing returns to the concurrent process number addition process and the process is repeated (the step S1302). After the registration-imageaddition process has been performed at the step S1309, the process for all the image files is completed, thereby terminating the registration process.

Figure 14:
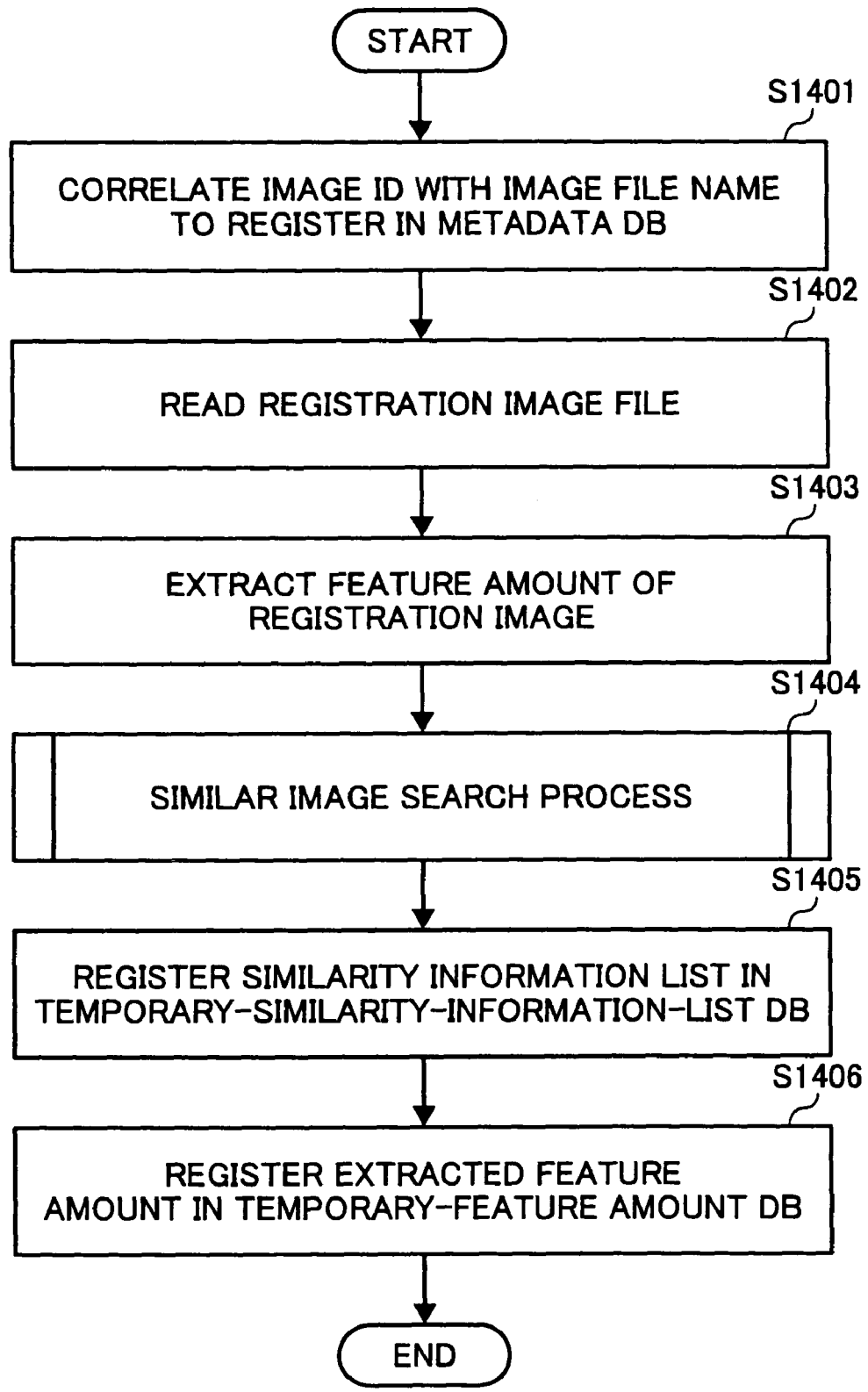
FIG. 14 is a detailed flowchart of a temporary registration process shown in FIG. 13.

The temporary-registration process shown at the step S1304 is explained in detail. FIG. 14 is a flowchart that represents the whole flow of the temporary registration process according to the second embodiment.

Since the metadata registration process, the feature amount extraction process, and the similar image search process at the steps from S1401 to S1404 are similar to those of the registration process at the steps from S602 to S605 shown in FIG. 6 performed by the information management apparatus 100 according to the first embodiment. Therefore, their explanation is abbreviated.

After the similar image search process (the step S1404), the temporarily-registering unit 1207 registers the similarity-information list in the temporary similarity-information-list DB 1226 (step S1405). Next, the temporarily registering unit 1207 registers the feature amount extracted by the feature-amount extracting unit 102 at the step S1403 in the temporary-feature-amount DB 1225 (step S1406), and then the temporary registration process is terminated.

Figure 15:
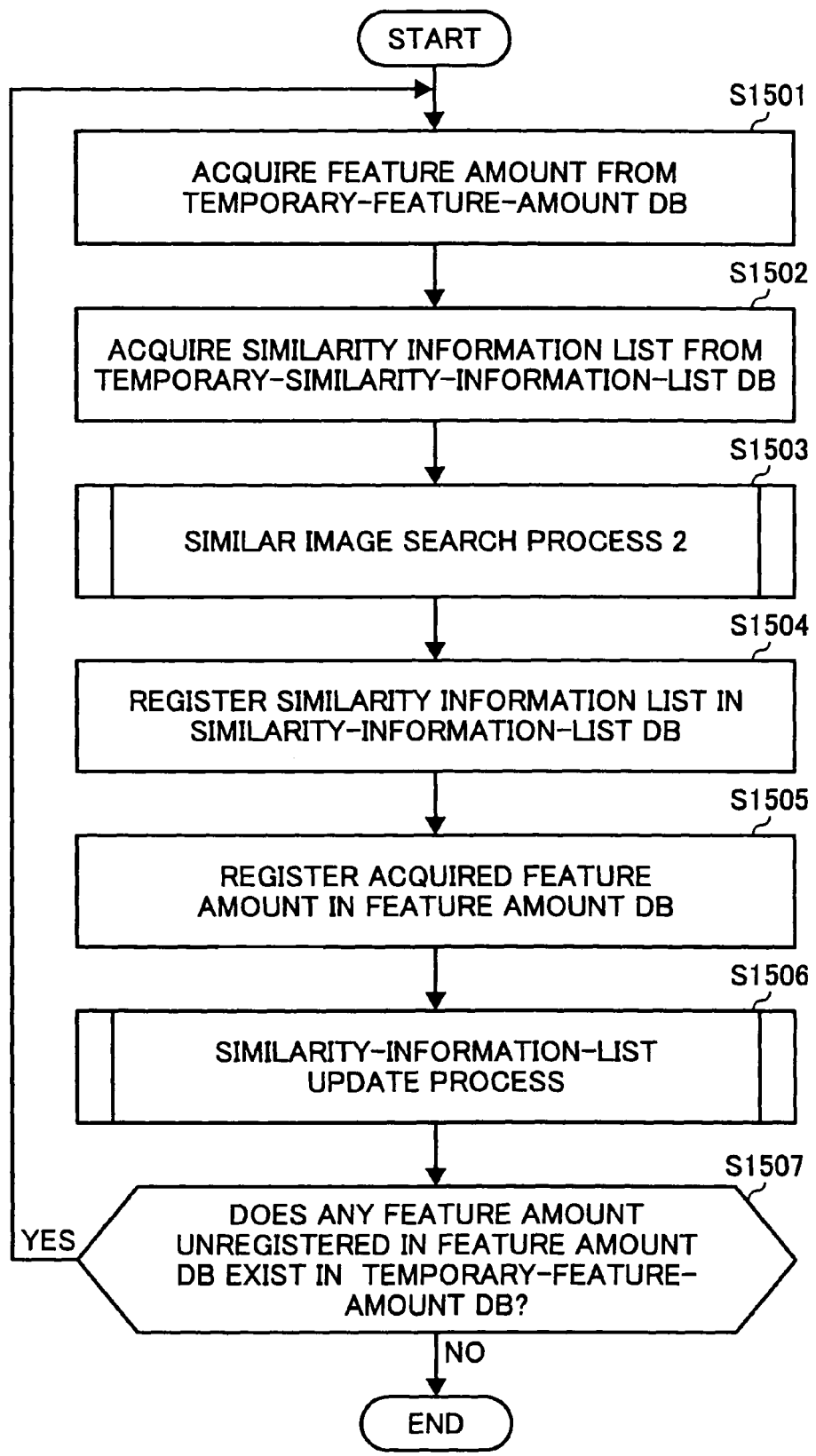
FIG. 15 is a detailed flowchart of a registration-image-addition process according to the second embodiment shown in FIG. 13.

The registration-image-addition process shown at the steps S1308 and S1309 is explained in detail. FIG. 15 is a flowchart that represents the whole flow of the registration-image-addition process according to the second embodiment.

In the registration-image-addition process, a similarity relation between images temporarily kept is determined and added to the temporary similarity-information list, followed by moving the contents in the temporary similarity-information-list DB 1226 to the similarity-information-list DB 124. Further, the contents in the temporary-feature-amount DB 1225 are moved to the feature-amount DB 123.

First, the searching unit 105 acquires a feature amount from the temporary-feature-amount DB 1225 (step S1501) and a similarity-information list from the temporary similarity-information-list DB 1226 (step S1502). Next, a similar image registration process 2 to search images kept temporarily for a similar image is performed (step S1503). The details of the similar image registration process 2 will be described later.

After the similar image registration process 2, the registering unit 1203 registers the similarity-information-list in the similarity-information-list DB 124 (step S1504). Further, the registering unit 1203 registers the feature amount acquired at the step S1501 in the feature-amount DB 123 (step S1505).

Subsequently, a similarity-information-list update process is performed (step S1506). The similarity-information-list update process is similar to the process at the step S607 in FIG. 6 that represents the registration process according to the first embodiment, and therefore, its explanation is abbreviated.

After performing the similarity-information-list update process, the registering unit 1203 determines whether any feature amount that has not been registered yet in the feature-amount DB 123 exists in the temporary-feature-amount DB 1225, that is, whether unprocessed information exist is determined (step S1507).

When there are feature amounts unregistered in the feature-amount DB 123 in the temporary-feature-amount DB 1225 (YES at the step S1507), processing returns to the process that acquires a feature amount from the temporary-feature-amount DB 1225 and then the process is repeated (the step S1501).

When there are not any feature amounts unregistered in the feature-amount DB 123 in the temporary-feature-amount DB 1225 (NO at the step S1507), the registration-image-addition process is terminated.

Figure 16:
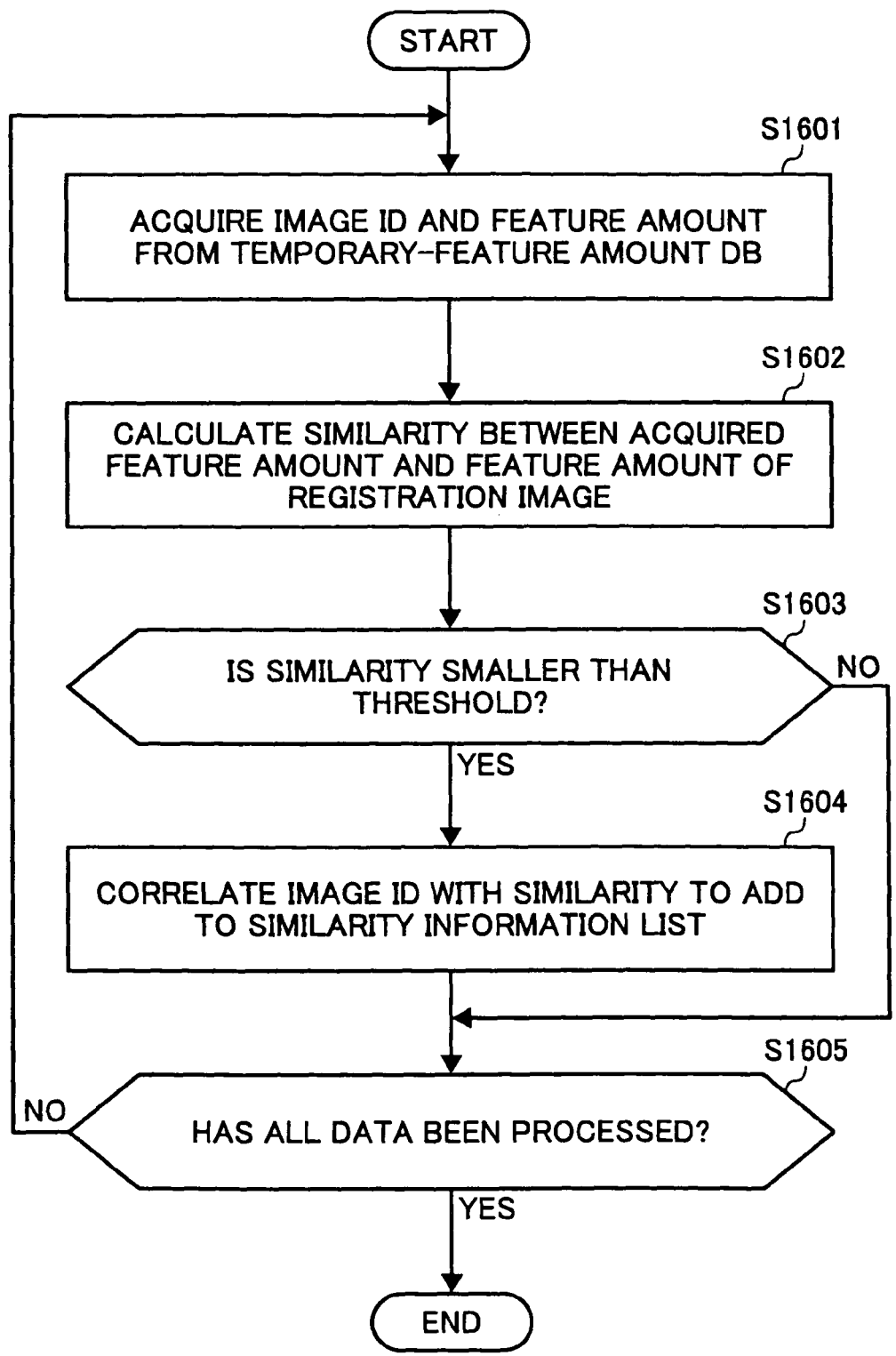
FIG. 16 is a detailed flowchart of a similar image registration process 2 shown in FIG. 15.

The details of the similar image registration process 2 shown at the step S1503 are explained. FIG. 16 is a flowchart that represents the whole flow of the similar image registration process 2 according to the second embodiment.

The searching unit 105 acquires an image ID and a feature amount from the temporary-feature-amount DB 1225 (step S1601). The similarity calculating unit 106 calculates a similarity between the acquired feature amount and the feature amount of the registration image (step S1602).

The similarity calculating unit 106 determines whether the similarity is smaller than a predetermined threshold (step S1603).

When the similarity is smaller than the predetermined threshold (YES at the step S1603), the image information searched for from the feature-amount DB is determined similar to the image information to register, and therefore, the image ID acquired at the step S1601 is designated as a similar-image ID, associated with the similarity calculated at the step S1602, and added to the similarity-information list (step S1604).

After the addition to the similarity-information list or when the similarity is determined not to be smaller than the predetermined threshold at the step S1603 (NO at the step S1603), the searching unit 105 determines whether all data in the temporary-feature-amount DB 1225 has been processed (step S1605).

When not all the data has been processed (NO at the step S1605), a next image data is acquired and the process is repeated (the step S1601). When all the data has been processed (YES at the step S1605), the similar image search process 2 is terminated.

In this way, according to the second embodiment, the extraction process for feature amount and the search process for similar image can be performed by concurrent processes, and therefore, speed-up of the registration process can be realized.

A modification example of the second embodiment is explained. In the example of concurrent processes described above, the calculation of a similarity between an image to register and an existing image is performed concurrently. At this time, there is a possibility that read-in processes of the same existing image may be performed in individual concurrent processes. When an image is read, disk access occurs and the load of disk access is generally large. Therefore, when process to read the same image can be shared, the process may be performed at much higher speed.

Figure 17:
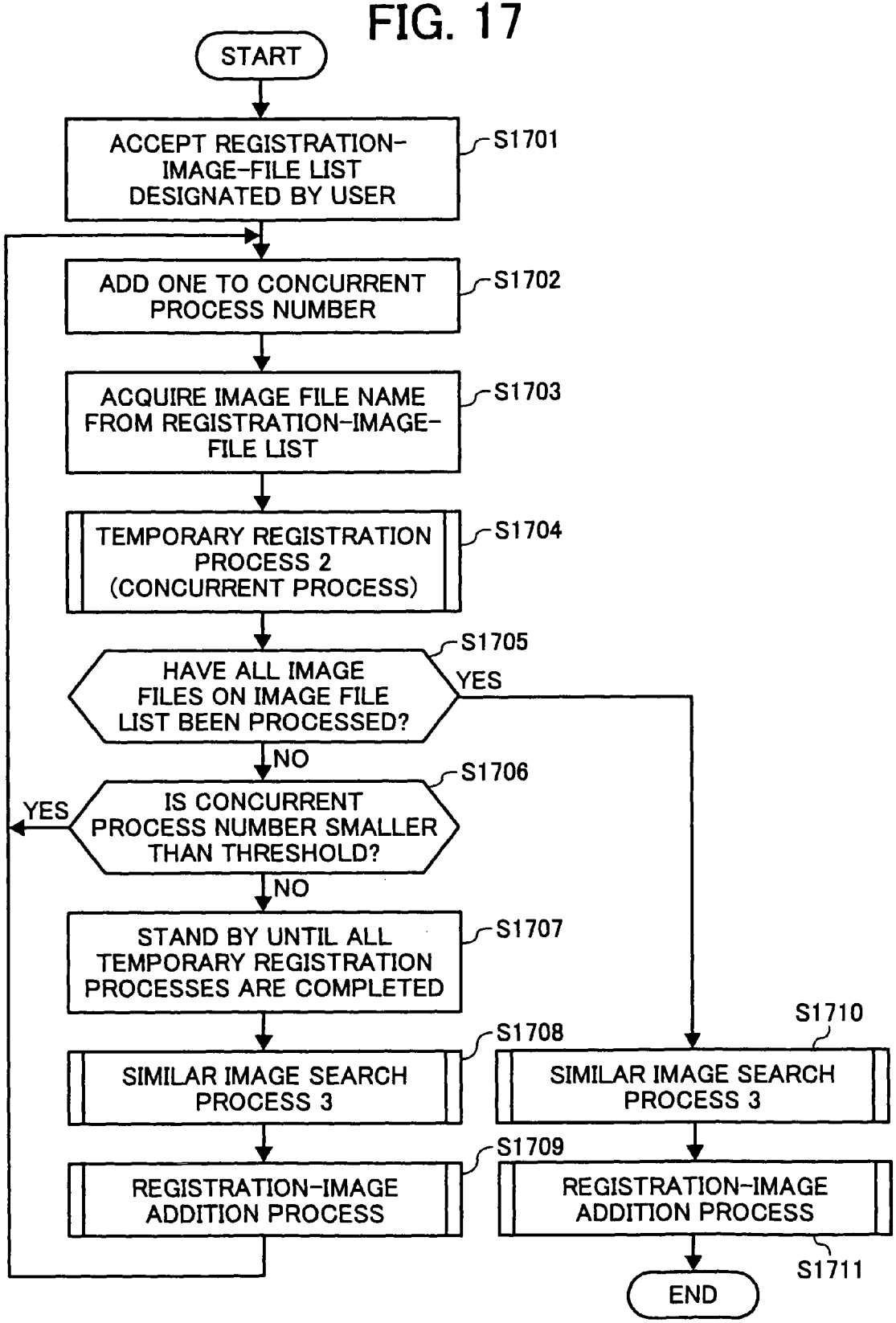
FIG. 17 is a flowchart of a registration process in the modified embodiment.

Hereinafter, an example of concurrent processes performed by allowing an image read-in process to be shared is explained. FIG. 17 is a flowchart that represents a modification example of the whole flow of the registration process according to the second embodiment.

The acquisition process for image-file name at steps from S1701 to S1703 is similar to that at steps from S1301 to S1303 in FIG. 13, and therefore, its explanation is abbreviated.

After acquiring an image-file name at the step S1703, a temporary registration process 2 that concurrently performs the extraction of feature amounts with respect to the acquired image files (step S1704). The details of the temporary registration process 2 will be described later.

After the temporary registration process 2 has been performed, the registering unit 1203 determines whether all image files on the image file list have been processed (step S1705). When all the image files have been processed (YES at the step S1705), a similar image search process 3 in which a similar image is searched for based on the feature amounts of the image information having been temporarily processed so far is performed (step S1710). The detailed similar image search process 3 will be described later.

When not all the image files have been processed (NO at the step S1705), the registering unit 1203 determines whether the concurrent process number is smaller than a predetermined threshold (step S1706).

When the concurrent process number is smaller than the predetermined threshold (YES at the step S1706), a temporary registration process can be further performed concurrently. Therefore, processing returns to the concurrent process number addition process and the process is repeated (the step S1702).

When the concurrent process number is not smaller than the predetermined threshold (NO at the step S1706), it can be determined that the concurrent process number exceeds the maximum processable concurrent process number, and therefore, the registering unit 1203 stands by until all temporary registration processes are completed (step S1707), followed by performing the similar image search process 3 (step S1708).

After performing the similar image search process 3 at the step S1708 or the step S1710, a registration-image-addition process is performed (step S1709 and step S1711). The registration-image-addition process is similar to the registration-image-addition process explained in FIG. 15, and therefore, its explanation is abbreviated.

After the registration-image-addition process at the step S1709 has been performed, unprocessed image files exist, and therefore, processing returns to the concurrent process number addition process and the process is repeated (the step S1702). After the registration-image-addition process at the step S1711 has been performed, the process for all the image files is completed, and the registration process is terminated.

Figure 18:
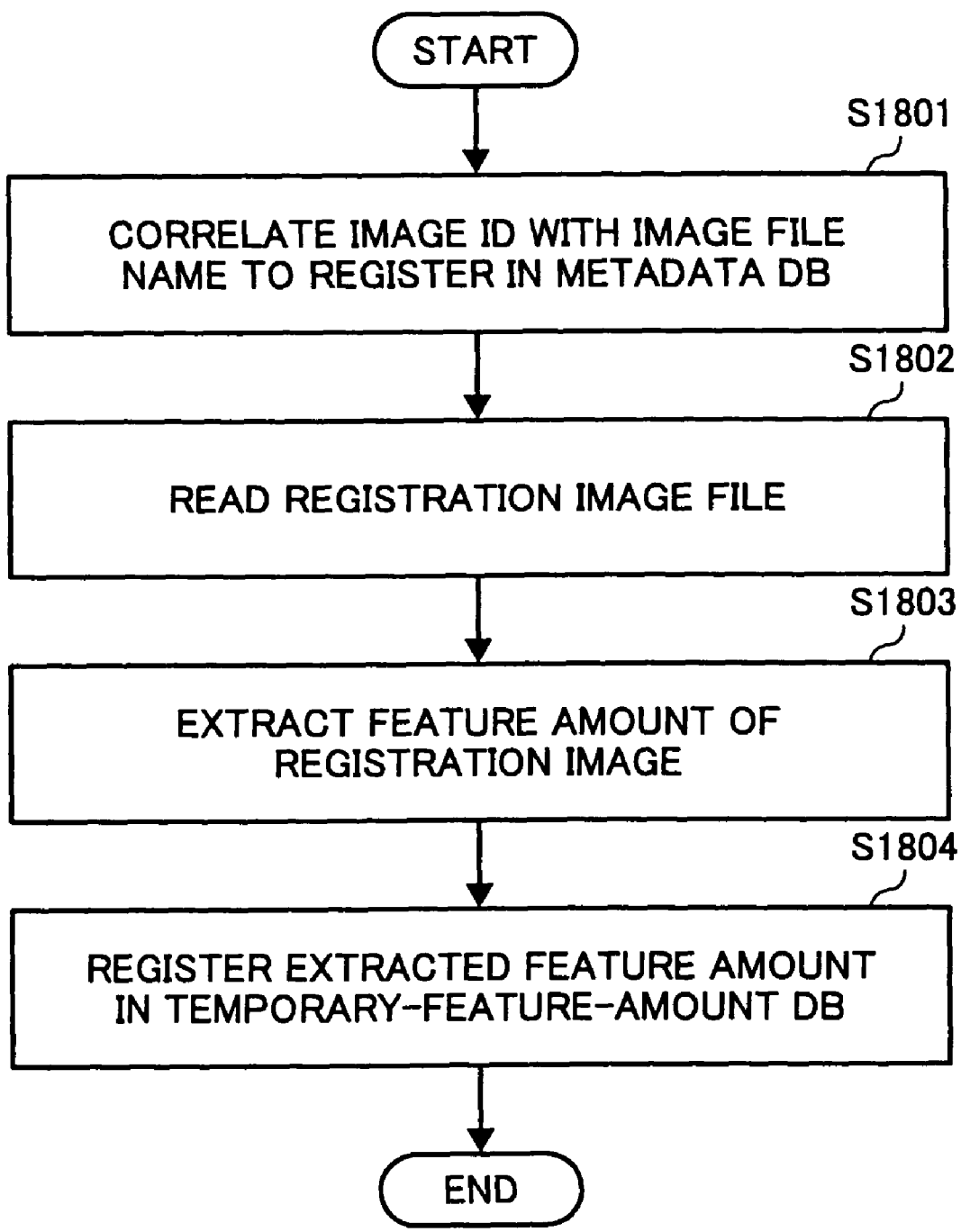
FIG. 18 is a detailed flowchart of a temporary registration process 2 shown in FIG. 17 according to the second embodiment.

The temporary registration process 2 shown at the step S1704 is explained in detail. FIG. 18 is a flowchart that represents the whole flow of the temporary registration process 2 according to the second embodiment.

The feature amount extraction process at steps from S1801 to S1803 is similar to that at the steps from S1401 to S1403 in FIG. 14, and therefore its explanation is abbreviated. Further, the temporary-feature-amount registration process at step S1804 is similar to that at the step S1406 in FIG. 14, and therefore, its explanation is abbreviated.

In other words, the temporary registration process 2 in FIG. 17 corresponds to the temporary registration process in FIG. 14 except for the steps S1404 and S1405 at which a similar image is searched for and registered in the temporary similarity-information-list DB 1226. In the modification example of the second embodiment, the registration process on a temporary similarity-information list is to be performed in the similar image search process 3 after the number of extracted temporary-feature-amounts has reached a certain number.

Figure 19:
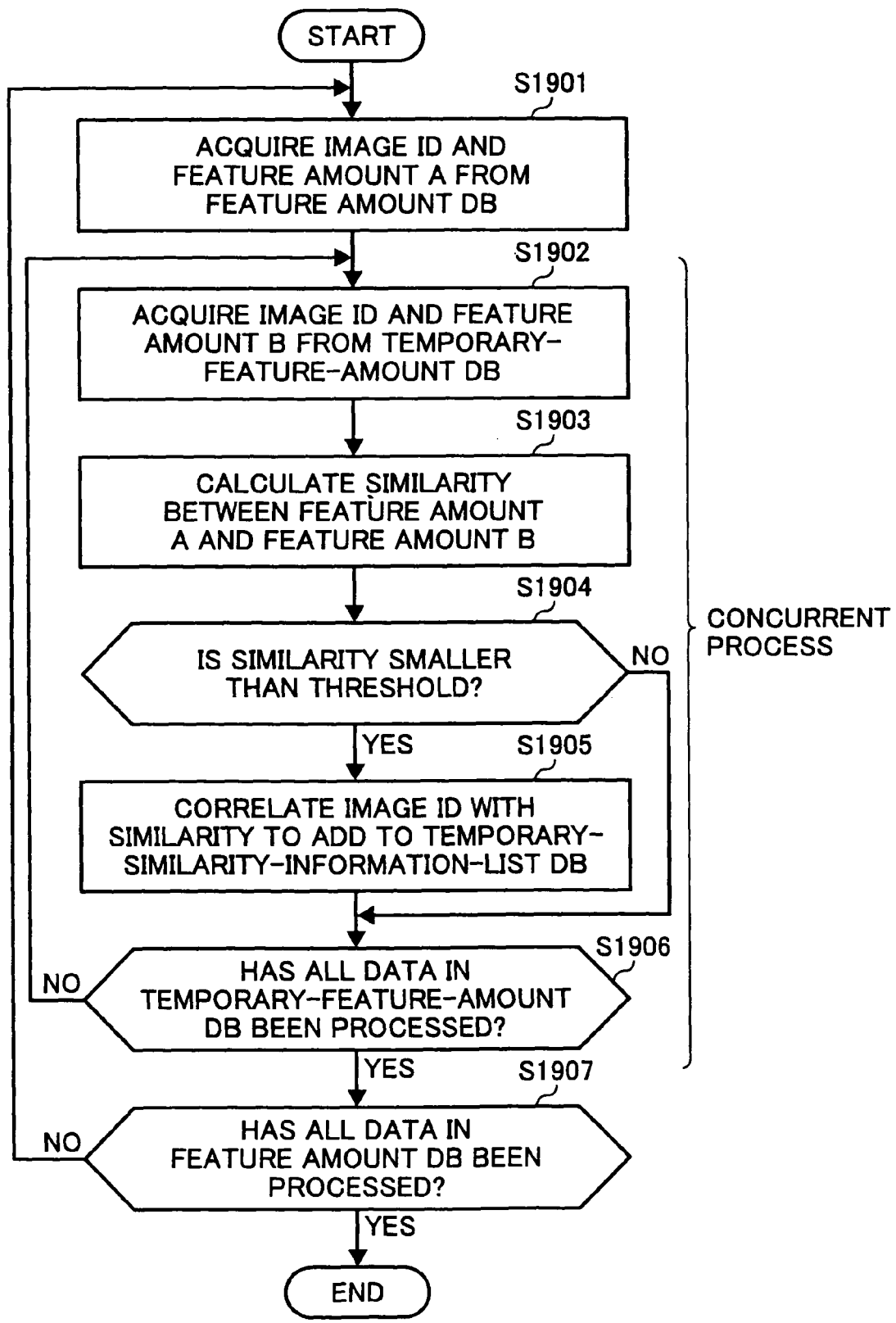
FIG. 19 is a detailed flowchart of a similar image search process 3 shown in FIG. 17 according to the second embodiment.

The similar image search process 3 shown at the steps S1708 and S1710 is explained in detail. FIG. 19 is a flowchart that represents the whole flow of the similar image search process 3 according to the second embodiment.

First, the searching unit 105 acquires an image ID and a feature amount from the feature-amount DB 123 (step S1901). Here, the acquired feature amount is designated as a feature amount A. The acquired feature amount A is stored in a memory such as random access memory (RAM) (not shown) that can be accessed at high speed.

Next, the searching unit 105 acquires an image ID and a feature amount from the temporary-feature-amount DB 1225 (step S1902). Here, the acquired feature amount is designated as a feature amount B. The processes at steps from S1902 to S1906 are performed concurrently.

The similarity calculating unit 106 calculates a similarity between the feature amount A and the feature amount B (step S1903). Although the similarity calculation process is also performed concurrently, it is not necessary to access the feature-amount DB 123 every time since the feature amount A has already been stored in the RAM. Owing to this, the similarity search process 3 can be performed at high speed, resulting in realization of speeding up of the registration process.

The similarity calculating unit 106 determines whether the similarity is smaller than a predetermined threshold (step S1904).

When the similarity is smaller than the predetermined threshold (YES at the step S1904), the image information searched for from the feature-amount DB can be determined similar to the image information to register. Therefore, the image ID acquired at the step S1901 is designated as a similar-image ID, associated with the similarity calculated at the step S1903, and added to the temporary similarity-information-list DB 1226 (step S1905).

After the addition to the similarity-information-list DB 124, or when the similarity is determined not to be smaller than the predetermined threshold at the step 1904 (NO at the step S1904), the searching unit 105 determines whether all data in the temporary-feature-amount DB 1225 has been processed (step S1906).

When not all the data has been processed (NO at the step S1906), a next image data is acquired from the temporary-feature-amount DB 1225 and the process is repeated (the step S1902).

When all the data has been processed (YES at the step S1906), one unit of the concurrent process is completed. After the processes at the steps from S1902 to S1906 performed concurrently are all completed, the searching unit 105 determines whether all data in the feature-amount DB 123 has been processed (step S1907).

When not all the data has been processed (NO at the step S1907), a next image data is acquired from the feature-amount DB 123 and the process is repeated (the step S1901).

When all the date has been processed (YES at the step S1907), the similar image search process 3 is terminated.

In this way, in the similar image search process 3, a feature amount of an image (it is designated as feature amount A) is acquired from the feature-amount DB 123 first, followed by comparing with another feature amount of an image acquired from the temporary-feature-amount DB 1225 in a concurrent process. Owing to this, since the process for data read-out from the feature-amount DB 123 is allowed to be concurrent, the number of disk access is decreased and a speed up of the registration process can occur.

As described above, the information management apparatus 1200 according to the second embodiment can perform a similar image search process, a feature amount calculation process, and the like that have a large processing load in concurrent processes. Owing to this, when a plurality of pieces of information to register exists and the information is collectively registered, a speed-up of the registration process can be realized. Further, concurrent processes can be performed by allowing a disk access process in the feature amount calculation process to be shared, and therefore, it is possible to realize further speed-up of the registration process.

According to the first and the second embodiments, there is a precondition that an image is designated and an image similar to the designated image is to be searched. However, in the search process for image, another search method in which a keyword is designated and image information related to the keyword is searched for is widely performed similarly to a search for document information or the like.

An information management apparatus according to a third embodiment of the present invention is based on the precondition that image information is searched for from metadata such as keyword. In this case, a similarity-information list that has been registered before is utilized and an appropriate search result is output. That is, similarity information on image information searched for in a keyword search is acquired, and image information included in the similarity information in a larger number is preferentially output as the search result.

Figure 20:
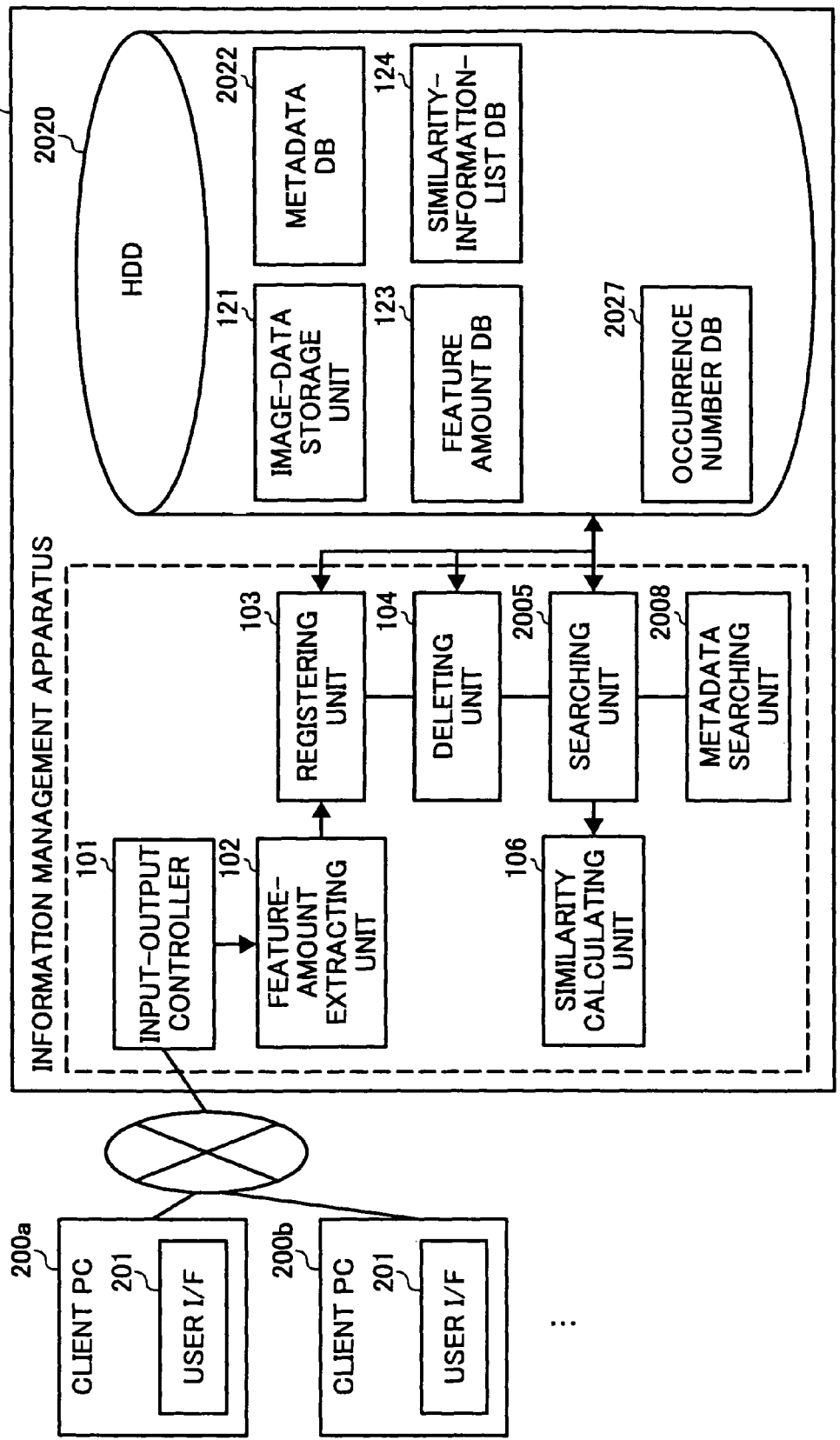
FIG. 20 is a block diagram of an information management apparatus according to a third embodiment of the present invention.

FIG. 20 is a block diagram of an information management apparatus 2000 according to the third embodiment. As shown in the figure, the information management apparatus 2000 is provided with a HDD 2020 as main hardware. Further, as the main software structure, the I/O controller 101, the feature-amount extracting unit 102, the registering unit 1203, the deleting unit 104, a searching unit 2005, the similarity calculating unit 106, and a metadata searching unit 2008 are provided.

According to the third embodiment, the addition of an occurrence number DB 2027 to the HDD and the data structure of a metadata DB 2022 are different from the first embodiment. Further, the addition of the metadata searching unit 2008 and the function of the searching unit 2005 are different from the first embodiment. The other components and functions are the same as those in the block diagram of FIG. 1 representing the configuration of the information management apparatus 100 according to the first embodiment. Tike components are designated by like reference numbers, and their explanation is abbreviated here.

The occurrence number DB 2027 is a storage unit that stores numbers for every image occurring in the similarity-information list with respect to the image information that is the keyword search result. FIG. 21 is a detailed diagram for explaining one example of data structure of the occurrence number DB 2027.

As shown in the figure, in the occurrence number DB 2027, image ID and occurrence number are associated with each other and stored. The calculation method of an occurrence number will be described later.

The metadata DB 2022 is a storage unit that stores metadata with respect to image data. According to the third embodiment, keywords as metadata are stored in the metadata DB 2022 besides image-file names. FIG. 22 is a detailed diagram to explain one example of data structure of the metadata DB 2022.

As shown in the figure, in the metadata DB 2022, image ID, image-file name, and keyword that is one example of metadata are associated with one another and stored. Metadata is not limited to image-file name and keyword. As long as metadata represents attributes of image information, any information such as registration date, updated date, and registrant can be stored.

The metadata searching unit 2008 searches the metadata DB 2022 for metadata input by a user as its search key and outputs image information that corresponds to the condition.

The searching unit 2005 performs a process to search the image-data storage unit 121, the metadata DB 2022 and the feature-amount DB 123 for data.

Further, the searching unit 2005 performs a process in which a similarity-information list associated with the image information output by the metadata searching unit 2008 is acquired from the similarity-information-list DB 124 and similarity information included in the acquired similarity-information list is output as the search result. At this time, the number occurring in the similarity-information list is calculated with respect to all image information included in the acquired similarity-information list and registered in the occurrence number DB 2027.

Furthermore, the searching unit 2005 accesses the occurrence number DB 2027, preferentially acquires information with a larger occurrence number rather than information with a smaller occurrence number, as the search result, and outputs. Owing to this, not only can a search result be acquired with reference to similarity information registered in advance but also more useful information compatible with a search key can be output as a search result.

Figure 23:
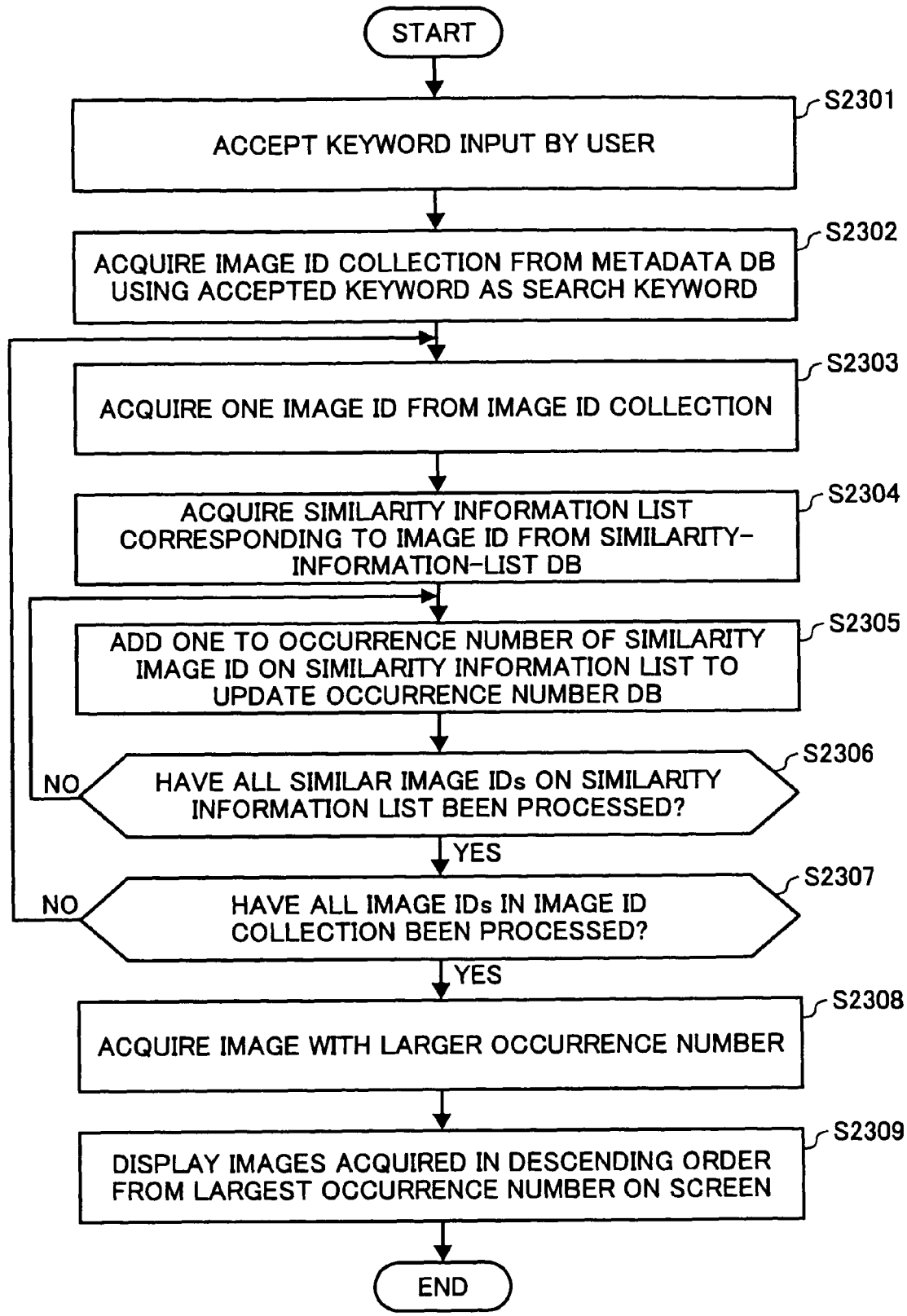
FIG. 23 is a flowchart of a search process according to the third embodiment.

A search process for information performed by the information management apparatus 2000 configured as described above according to the third embodiment is explained. FIG. 23 is a flowchart that represents the whole flow of a search process according to the third embodiment.

The I/O controller 101 accepts a keyword input by a user that serves as a search key (step S2301). The metadata searching unit 2008 acquires an image ID collection from the metadata DB 2022 using the keyword accepted as the search key (step S2302).

The image ID collection means information including all image IDs associated with the keyword that corresponds to a keyword serving as a search key. For example, when "lion" is input as a search key assuming that the information shown in FIG. 22 is stored in the metadata DB 2022, the numbers 1, 2, and 10 are included as image IDs in the image ID collection.

The searching unit 2005 acquires one image ID from the image ID collection (step S2303) and then a similarity-information list corresponding to the acquired image ID from the similarity-information-list DB 124 (step S2304).

Next, the searching unit 2005 adds one to the occurrence numbers of the similar-image IDs in the acquired similarity-information list and updates the occurrence number DB 2027 (step S2305). For example, when a similarity-information list corresponding to the image ID=1 in FIG. 4 is acquired, the numbers 2 and 10 are included as the similar-image IDs, and therefore, one is added to the occurrence number in the occurrence number DB 2027 with respect to each image ID.

The searching unit 2005 determines whether all similar-image IDs in the similarity-information-list have been processed (step S2306), and when not all of the similar-image IDs have been processed (NO at the step S2306), a next similar-image ID is acquired and the process is repeated (the step S2305).

When all the image IDs have been processed (YES at the step 2306), the searching unit 2005 determines whether all the image IDs in the image ID collection have been processed (step S2307).

When not all the similar IDs have been processed (NO at the step S2307), a next image ID is acquired, and the process is repeated (the step 2303).

When all the similar-image IDs have been processed (YES at the step S2307), the searching unit 2005 accesses the occurrence number DB 2027 and acquires images that have larger occurrence numbers (step S2308).

More specifically, first, image IDs whose occurrence numbers larger than a predetermined threshold are acquired from the occurrence number DB 2027. It may be adapted such that a predetermined number of image IDs are acquired in the descending order from a largest occurrence number. An image-file name corresponding to the acquired image ID is acquired from the metadata DB 2022, followed by acquiring image data corresponding to the image-file name from the image-data storage unit 121.

Next, the I/O controller 101 displays the acquired images in the descending order from a largest occurrence number on the screen of the user I/F 201 of the client PC (step S2309), and the search process is terminated.

The search process according to the third embodiment is specifically explained. Here, the search process is based on the precondition that the similarity-information list as shown in FIG. 4 is registered in the similarity-information-list DB 124 and the metadata as shown in FIG. 22 is registered in the metadata DB 2022.

In this case, assume that a user inputs "lion" as a keyword for search (step S2301). Image IDs whose keyword is "lion" are searched for from the metadata DB 2022, and Image IDs=1, 2, and 10 are stored in an image ID collection (step S2302).

Next, a similarity-information-list including "2:0.10, 10:0.11, . . . " as shown in FIG. 4 is acquired as a similarity-information list corresponding to the first image ID=1 in the image ID collection (steps S2303 and S2304).

In this similarity-information list, image IDs=2 and 10 are included as similar-image IDs, and therefore, one is added to the occurrence number with respect to image IDs 2 and 10 (step S2305). Similarly, a similarity-information list with respect to the image ID=2 in the image ID collection is acquired, and addition to the occurrence number of the similar-image ID is performed. As the similarity-information list of the image ID=2, "1:0.10, 3:0.11, . . . " is acquired and therefore one is added to the occurrence number of the IDs=1 and 3.

Further, acquisition of a similarity-information list and addition to the occurrence number of the similar-image ID are performed with respect to the image ID 10 in the image ID collection. As the similarity-information list of the image ID=10, "1:0.10" is acquired, and therefore one is added to the occurrence number of the image ID=1.

As the result, the occurrence number of the image ID=1 is two, and the occurrence number of each of the image IDs=2, 3, and 10 is one. This state is shown in the occurrence number DB 2027 in FIG. 21. In this example, the occurrence number of the image ID=1 is the largest, and therefore, the image information on the image ID=1 is displayed on the screen preferentially (steps S2308 and S2309).

In this way, the information management apparatus 2000 according to the third embodiment does not merely output a search result for the keyword search but preferentially outputs image information that has more similar relations among image information included in the search result. Thus, a search result more appropriate for the keyword can be presented to the user.

The second embodiment is based on the precondition that a large amount of image information is collectively registered. On the other hand, a fourth embodiment of the present invention is based on the precondition that a small piece of image information is subsequently registered by a user. In this case, the information is temporarily kept and when the number of pieces of the information reaches a certain number, they are registered in concurrent processes, thereby making it possible to realize speed-up of the registration process.

An information management apparatus according to the fourth embodiment stores image information registered by a user in a temporary memory. When the number of pieces of the image information reaches a certain number, they are collectively moved to a memory in which information is practically registered. Further, at the time of a search, the information stored in the temporary memory is also processed for search as search targets.

Figure 24:
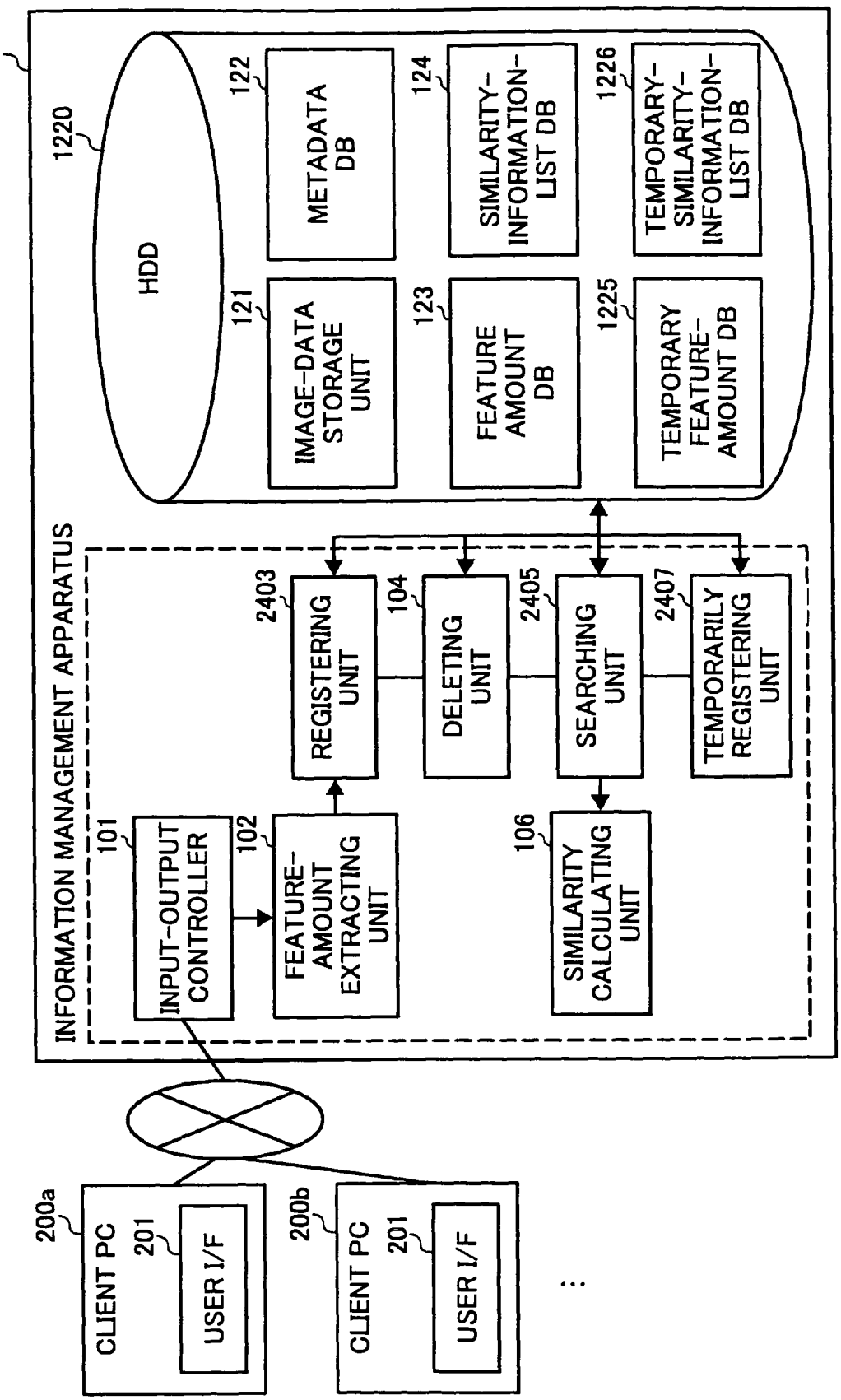
FIG. 24 is a block diagram of an information management apparatus according to a fourth embodiment of the present invention.

FIG. 24 is a block diagram of an information management apparatus 2400 according to a fourth embodiment of the present invention. As shown in the figure, the information management apparatus 2400 is provided with the HDD 1220 as main hardware. Further, as main software structure, the I/O controller 101, the feature-amount extracting unit 102, a registering unit 2403, the deleting unit 104, a searching unit 2405, the similarity calculating unit 106, and a temporarily registering unit 2407 are provided.

According to the fourth embodiment, the functions of the registering unit 2403, the searching unit 2405, and the temporarily registering unit 2407 are different from those according to the second embodiment. The other components and functions are similar to those in the block diagram of FIG. 12 representing the configuration of the information management apparatus 1200 according to the second embodiment, and therefore, like components are designated by like reference numbers, and the explanations are abbreviated here.

The registering unit 2403 performs a registration process for data with respect to the image-data storage unit 121, the metadata DB 122, and the feature-amount DB 123.

Further, the registering unit 2403 moves information in the temporary-similarity-information-list DB 1226 to the similarity-information-list DB 124 when the temporarily registering unit 2407 registers more pieces of information than a predetermined number in the temporary-similarity-information-list DB 1226.

The searching unit 2405 performs a process in which the image-data storage unit 121, the metadata DB 122, and the feature-amount DB 123 are searched for data.

Further, the searching unit 2405 acquires a similarity-information list of an image that serves as a search base from the similarity-information-list DB 124. Furthermore, the searching unit 2405 compares feature amounts stored in the temporary-feature-amount DB 1225 with the feature amount of the image that is the search base and acquires a similar image from image information stored in the temporary-feature-amount DB 1225, thereby making it possible to include in the search targets image information for which a temporary registration process has been performed but which has not yet been registered in the similarity-information-list DB 124.

The temporarily registering unit 2407 registers a feature amount extracted by the feature-amount extracting unit 102 in the temporary-feature-amount DB 1225.

Figure 25:
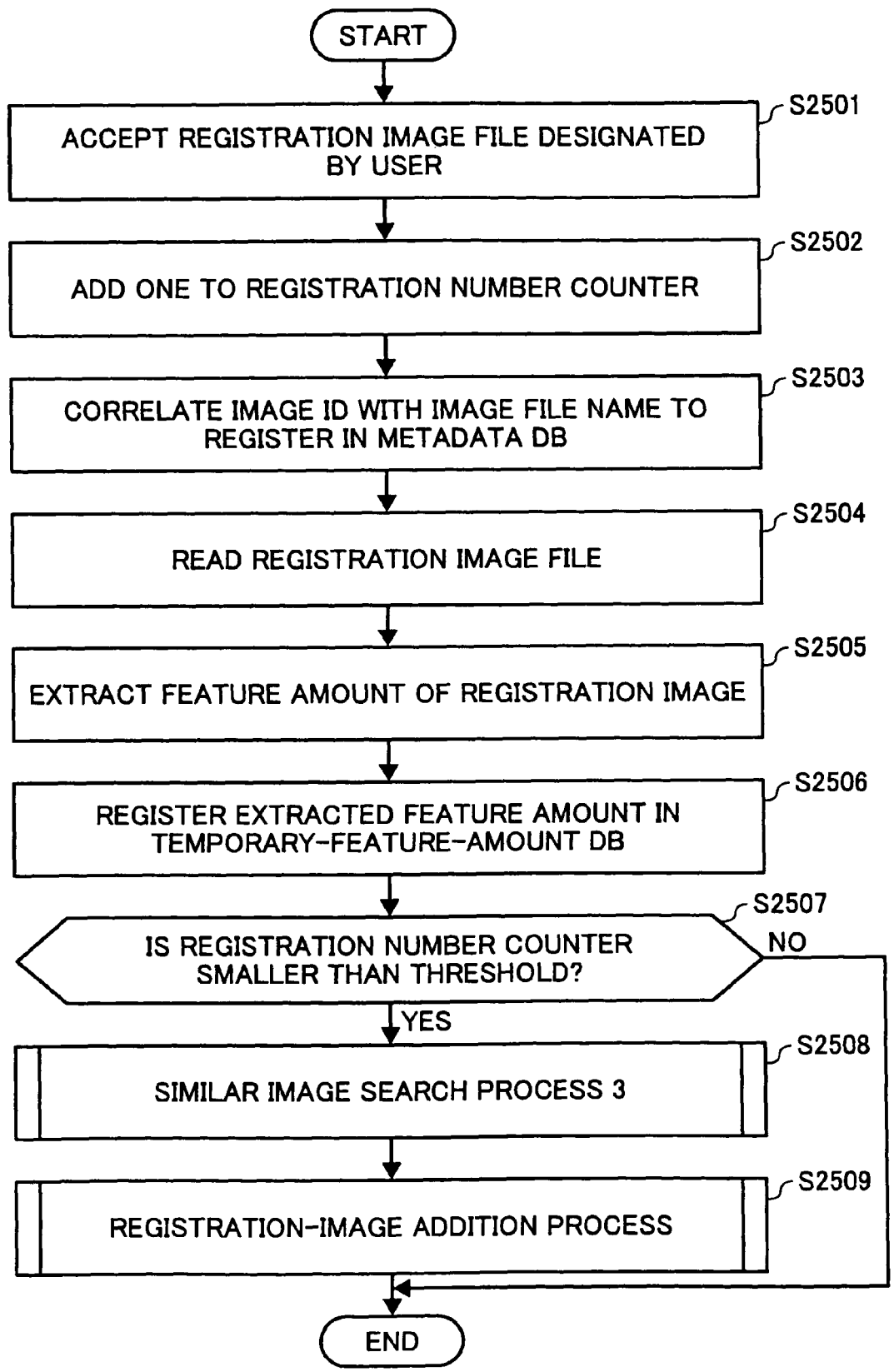
FIG. 25 is a flowchart of a registration process according to the fourth embodiment.

A registration process performed by the information management apparatus 2400 configured as described above according to the fourth embodiment is explained. FIG. 25 is a flowchart of the registration process according to the fourth embodiment.

The I/O controller 101 accepts a registration-image-file designated and input on the user I/F 201 of the client PC by a user (step S2501). The registering unit 2403 adds one to the registration number that shows the number registered in the temporary-feature-amount DB 1225 (step S2502).

The metadata registration process to the feature amount extraction process at the steps from S2503 to S2505 are similar to those at the steps from S602 to S604 in FIG. 6 representing the registration process performed by the information management apparatus 100 according to the first embodiment, and therefore, their explanation is abbreviated.

After the feature amount extraction process (step S2505), the temporarily registering unit 2407 registers the feature amount extracted by the temporarily registering unit 2407 in the temporary-feature-amount DB 1225 (step S2506).

Next, the registering unit 2403 determines whether the registration number is larger than a predetermined threshold (step S2507). When the number is larger (YES at the step S2507), a similar image search process 3 in which similar image is searched for based on the feature amounts of the image information for which the temporary registration process has already been performed is performed (step S2508). The similar image search process 3 is similar to that shown in FIG. 19 explained according to the second embodiment, and therefore the explanation is abbreviated.

As explained according to the second embodiment, since the similar image search process 3 can be performed by concurrent processes, speed-up of the registration process can also be realized according to the fourth embodiment.

After performing the similar image search process 3, a registration-image-addition process in which the feature amount and the similarity-information list of the image information for which a temporary registration process has already been performed are moved to the feature-amount DB 123 and the similarity-information-list DB 124, respectively (step S2509). The registration-image-addition process is similar to that shown in FIG. 15 explained according to the second embodiment, and therefore the explanation is abbreviated.

When the registration number is determined not to be larger than the predetermined threshold at the step S2507 (NO at the step S2507) or after performing the registration-image-addition process, the registration process is terminated.

Figure 26:
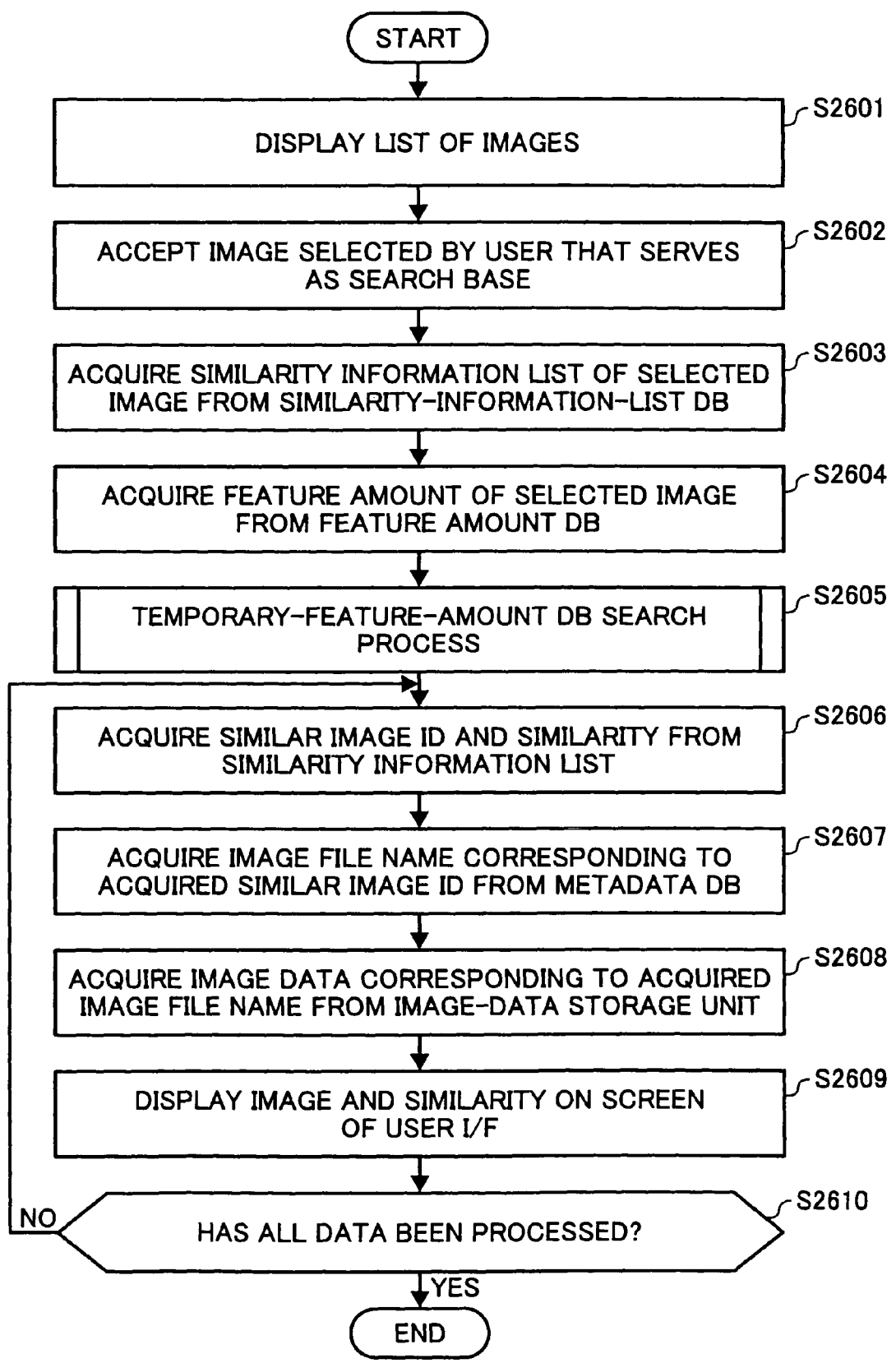
FIG. 26 is a flowchart of a similar image search process according to the fourth embodiment.

The search process performed by the information management apparatus 2400 configured as described above according to the fourth embodiment is explained. FIG. 26 is a flowchart that represents the whole flow of the search process according to the fourth embodiment.

The image selection acceptance process and the similarity-information list acquisition process at steps from S2601 to S2603 are similar to those at the steps from S901 to S903 in FIG. 9 that represents the registration process performed by the information management apparatus 100 according to the first embodiment, and therefore the explanation is abbreviated.

After acquiring a similarity-information list at the step S2603, the searching unit 2405 acquires a feature amount of the selected image from the feature-amount DB 123 (step S2604). The reason for this is that the acquired feature amount is used as a comparison target with respect to feature amounts stored in the temporary-feature-amount DB 1225 in a temporary-feature-amount DB search process described later.

Next, the temporary-feature-amount DB search process for acquisition of similar image from image information stored in the temporary-feature-amount DB 1225 is performed (step S2605). The details of the temporary-feature-amount DB search process will be described later.

The similarity information acquisition process and the similarity information display process at steps from S2606 to S2610 after performing the temporary-feature-amount DB search process are similar to those at the steps from S904 to S908 in FIG. 9 that represents the registration process performed by the information management apparatus 100 according to the first embodiment, and therefore, the explanation is abbreviated.

In this way, a search for temporarily registered information included in the search targets can also be performed at the steps S2604 and S2605, and therefore, even when the information is not registered in the memory in which information is practically stored, an appropriate search result can be output.

Figure 27:
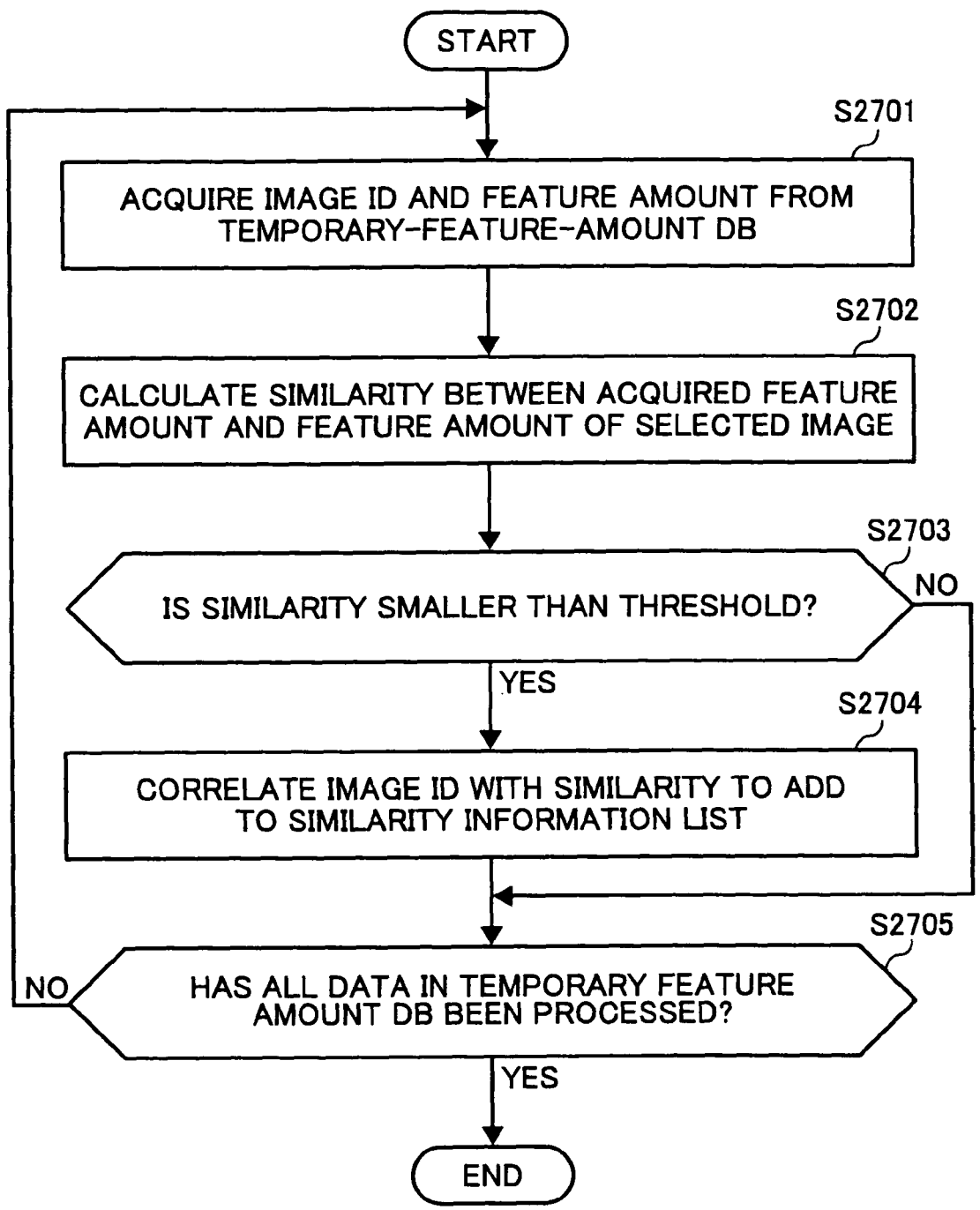
FIG. 27 is a detailed flowchart of a temporary-feature-amount DB search process shown FIG. 26.

The temporary-feature-amount DB search process shown at the step S2605 is explained. FIG. 27 is a flowchart that represents the whole flow of the temporary-feature-amount DB search process according to the fourth embodiment.

The searching unit 2405 acquires an image ID and a feature amount from the temporary-feature-amount DB 1225 (step S2701). The similarity calculating unit 106 calculates a similarity between the acquired feature amount and the feature amount of the selected image acquired at the step S2604 (step S2702).

The similarity calculating unit 106 determines whether the similarity is smaller than a predetermined threshold (step S2703).

When the similarity is smaller than the predetermined threshold (YES at the step S2703), the image information searched for from the feature-amount DB can be determined to be similar to the image information to register, and therefore, the image ID acquired at the step S2701 is designated as a similar-image ID, associated with the similarity calculated at the step S2702, and added to the similarity-information list (step S2704).

After the addition to the similarity-information list, or when the similarity is determined not to be smaller than the predetermined threshold at the step S2703 (NO at the step S2703), the searching unit 2405 determines whether all data in the temporary-feature-amount DB 1225 has been processed (step S2705).

When not all the data has been processed (NO at the step S2705), a next image data is acquired and the process is repeated (the step S2701). When all the data has been processed (YES at the step S2705), the temporary-feature-amount DB search process is terminated.

In this way, in the information management apparatus 2400 according to the fourth embodiment, image information registered by a user is stored in the temporary memory. When the number of registration reaches a predetermined number, it is possible to collectively move the information to the memory in which information is practically stored. At this time, the similar image search process with a large processing load can be performed by concurrent processes, thereby making it possible to realize speed-up of the registration process.

Since information stored in the temporary memory can also be processed for search as the search target at the time of search, an appropriate search result can be output even when the information is not stored in the memory in which information is practically stored.

The information management apparatuses according to the first to the fourth embodiments are provided with a control unit such as CPU, storage units such as read only memory (ROM) and RAM, outside storage units such as HDD and CD drive unit, a display unit such as display, and input units such as keyboard and mouse, respectively, and they are configured as hardware utilizing a common computer.

An information management program implemented by the information management apparatuses according to the first to the fourth embodiments is recorded, as a file that can be installed or implemented, in a recording medium such as compact disk (CD)-ROM, flexible disk (FD), CD-recordable (R) or digital versatile disk (DVD) that can be read by computer and is provided.

The information management program implemented by the information management apparatuses according to the first to the fourth embodiments may be adapted such that the program is stored in the computer connected to network such as Internet and provided by allowing the program to be downloaded via the network. Further, the information management program implemented by the information management apparatuses according to the first to the fourth embodiments may be adapted such that the program is provided or distributed via the network such as Internet.

Furthermore, the information management program implemented by the information management apparatuses according to the first to the fourth embodiments may be adapted so as to be integrated into ROM or the like in advance and provided.

The information management program implemented by the information management apparatuses according to the first to the fourth embodiments is configured in modules including each unit described above (the input/output controller, the feature-amount extracting unit, the registering unit, the deleting unit, the searching unit, the similarity calculating unit, the temporarily registering unit, the metadata searching unit), the CPU (processor) as the practical hardware reads out the information management program from the storage media to be implemented, thereby loading the each unit on the main storage unit and allowing the each unit to be created in the main storage unit.

According to one embodiment of the present invention, similarity information can be searched for with respect to information that has been registered, associated with information to register, and registered in a memory in advance. Owing to this, an effect that a search process can be performed at high speed by acquiring the similarity information registered in the memory and outputting it without searching for the similarity information at the time of the search is offered.

According to another embodiment of the present invention, not only can the similarity information on the information to register be registered but also the information to register can be correlated as similarity information on the similarity information and registered in the memory.

According to still another embodiment of the present invention, the similarity information can be associated with the information to register and registered in the memory in advance at the same time when the information is registered.

According to more over embodiment of the present invention, the similarity information registered in the memory can be acquired and output without searching for the similarity information at the time of the search.

According to yet another embodiment of the present invention, when registered information is deleted, the information to be deleted can be deleted from the similarity information on information included in the similarity information on the information to be deleted.

According to still another embodiment of the present invention, when there are a plurality of pieces of information to register, registration processes can be performed concurrently.

According to another embodiment of the present invention, when there are a plurality of pieces of the information to register, a feature amount calculation processes can be performed concurrently at the time of registration.

According to an embodiment of the present invention, when information is searched for according to metadata, similarity information on the information searched for is acquired and information included in the similarity information in a large number can be preferentially output as the search result.

According to an embodiment of the present invention, when information is temporarily registered in a temporary memory at the time of registering the information and a predetermined number of pieces of information are registered in the temporary memory, processes in which the information is collectively moved from the temporary memory to the memory in which information is practically stored can be concurrently performed.

According to one embodiment of the present invention, a search for information included in search targets that has been temporarily registered in the temporary memory when the information is registered can also be performed.

According to one embodiment of the present invention, an effect that image information is applicable as information and feature information on image information is applicable as feature amount is offered.

According to one embodiment of the present invention, the similarity information can be searched for with respect to information that has been registered, associated with information to register, and stored in the memory in advance.

According to one embodiment of the present invention, not only can the similarity information on the information to register be registered but also the information to register can be correlated as similarity information on the similarity information and registered in the memory.

According to one embodiment of the present invention, the similarity information can be searched for, associated with the information to register, and registered in the memory in advance at the same time when the information is registered.

According to one embodiment of the present invention, similarity information register in the memory can be acquired and output without searching for the similarity information at the time of the search.

According to one embodiment of the present invention, when registered information is deleted, the information to be deleted can be deleted from the similarity information on information included in the similarity information on the information to be deleted.

According to one embodiment of the present invention, when there are a plurality of pieces of information to register, registration processes can be performed concurrently.

According to one embodiment of the present invention, when there are a plurality of pieces of the information to register, feature amount calculation processes can be performed concurrently at the time of registration.

According to one embodiment of the present invention, when information is searched for according to metadata, similarity information on the information searched for is acquired and information included in the similarity information in a large number can be preferentially output as the search result.

According to one embodiment of the present invention, when information is temporarily registered in the temporary memory at the time of registering the information and a predetermined number of pieces of information are registered in the temporary memory, processes in which the information is collectively moved from the temporary memory to the memory in which information is practically stored can be concurrently performed.

According to one embodiment of the present invention, a search for information, included in search targets, that has been temporarily registered in the temporary memory when the information is registered can also be performed. Owing to this, an effect that an appropriate search result can be output even when the information is not stored in the memory in which information is practically stored is offered.

According to one embodiment of the present invention, an effect that image information is applicable as information and feature information on image information is applicable as feature amount is offered.

According to one embodiment of the present invention, an effect that the method according to any one of the aspects described above is allowed to be performed by a computer is offered.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information management apparatus comprising:
   a feature-amount storing unit to store information in association with a feature-amount representing contents of the information;
   a similarity-information-list storing unit to store the information in association with a similarity-information list that includes at least one piece of similarity information corresponding to a feature-amount of which a similarity indicating a degree of being similar to the feature-amount of the information is larger than a predetermined threshold; and
   a processor configured to
       extract a first feature amount of first information that is target information to be registered;
       search the feature-amount storing unit for a second feature amount of second information;
       calculate a similarity between the first feature amount and the second feature amount; and
       register the first information in association with the similarity-information list in the similarity-information-list storing unit, the similarity-information list including the second information corresponding to the second feature amount of which the calculated similarity is larger than the threshold, as the similarity information.

2. The information management apparatus according to claim 1, wherein the processor acquires the similarity-information list corresponding to the similarity information similar to the first information from the similarity-information-list storing unit, and updates the similarity-information-list storing unit by adding the first information to the acquired similarity-information list as the similarity information.

3. The information management apparatus according to claim 1, wherein the processor, when the first information is to be newly registered, registers the first information in association with the similarity-information list in the similarity-information-list storing unit, the similarity-information list including the second information corresponding to the second feature amount of which the calculated similarity is larger than the threshold, as the similarity information.

4. The information management apparatus according to claim 1, wherein the processor, when an instruction to search for the similarity information of arbitrary information is received from a user, acquires the similarity-information list corresponding to the arbitrary information from the similarity-information-list storing unit, and outputs the similarity information included in the acquired similarity-information list as a search result.

5. The information management apparatus according to claim 1, wherein the processor is further configured to, upon deleting registered information, acquire the similarity-information list that includes information to be deleted, as the similarity information from the similarity-information-list storing unit, and to delete the information from the acquired the similarity-information list to update the similarity-information-list storing unit.

6. The information management apparatus according to claim 1, further comprising:
   a temporary similarity-information-list storing unit to temporarily store information in association with the similarity-information list that includes at least one piece of similarity information corresponding to a feature amount of which the similarity is larger than the threshold, wherein
   the processor is further configured to, when there are a plurality of pieces of information to be registered, execute a process of registering the information in association with the similarity-information-list in the temporary similarity-information-list storing unit, in a parallel manner, and wherein
   when amount of the information registered in the temporary similarity-information-list storing unit is equal to or more than a predetermined amount, the processor moves the information and the similarity-information list registered in the temporary similarity-information-list storing unit to the similarity-information-list storing unit.

7. The information management apparatus according to claim 1, further comprising:
   a temporary feature-amount storing unit to temporarily store information in association with the feature-amount of the information, wherein
   the processor is further configured to, when there are a plurality of pieces of information to be registered, execute a process of registering the information in association with the extracted feature amount in the temporary feature-amount storing unit, in a parallel manner, and wherein
   when amount of the information registered in the temporary feature-amount storing unit is equal to or more than a predetermined amount, the processor executes a process of calculating the similarity between the feature-amount of the information registered in the temporary feature-amount storing unit and the feature amount searched by for, in a parallel manner.

8. The information management apparatus according to claim 1, further comprising:
   a metadata storing unit to store information in association with metadata indicating attribute of the information, wherein
   the processor is further configured to, when an instruction to search for information with the metadata as a search key from a user, search the metadata storing unit for the information corresponding to the metadata designated as the search key, and wherein
   the processor is further configured to acquire the similarity-information list corresponding to the information searched for by the metadata searching unit from the similarity-information list storing unit, and outputs information that is more included in the similarity-information list prior to information that is less included in the similarity-information list, as a search result.

9. The information management apparatus according to claim 1, further comprising:
   a temporary feature-amount storing to that temporarily store information in association with a feature-amount of the information, wherein
   the processor is further configured to temporarily register information to be registered in association with the extracted feature-amount in the temporary feature-amount storing unit, and wherein
   when amount of the information registered in the temporary feature-amount storing unit is equal to or more than a predetermined amount, the processor executes a process of calculating the similarity between the feature amount of the information registered in the temporary feature-amount storing unit and the second feature amount, in a parallel manner.

10. The information management apparatus according to claim 9, wherein
when an instruction to search for the similarity information of arbitrary information is received from a user, the processor calculates the similarity between the feature-amount of the information registered in the temporary feature-amount storing unit and the feature amount of the arbitrary information, and
the processor acquires the information in association with the feature-amount of which the similarity is larger than the threshold from the temporary feature-amount storing unit as the similarity information, and outputs the acquired information as a search result, acquires the similarity-information list in association with the arbitrary information from the similarity-information-list storing unit, and outputs the similarity information included in the acquired similarity information list as the search result.

11. The information management apparatus according to claims 1, wherein
the information is image information, and
the feature-amount represents contents of the image information.

12. An information management method comprising:
extracting a first feature amount of first information that is target information to be registered, from metadata storing unit;
searching for a second feature amount of second information from a feature-amount storing unit that stores information in association with a feature-amount representing contents of the information;
calculating a similarity between the first feature amount and the second feature amount, the similarity indicating a degree of being similar to the feature-amount of the information; and
registering the first information in association with a similarity-information list in a similarity-information-list storing unit, the similarity-information list including the second information corresponding to the second feature amount of which the calculated similarity is larger than the threshold, as the similarity information, wherein the method is performed using a processor or a computer.

13. The information management method according to claim 12, further comprising temporary registering including, when there is a plurality of pieces of information to be registered, executing a process of registering the information in association with the similarity-information-list in a temporary similarity-information-list storing unit that temporarily stores information in association with the similarity-information list that includes at least one piece of similarity information corresponding to a feature amount of which the similarity is larger than the threshold, in a parallel manner, wherein
when amount of the information registered in the temporary similarity-information-list storing unit is equal to or more than a predetermined amount, registering the first information includes moving the information and the similarity-information list registered in the temporary similarity-information-list storing unit to the similarity-information-list storing unit.

14. The information management method according to claim 12, further comprising temporarily registering including, when there are a plurality of pieces of information to be registered, executes a process of registering the information in association with the extracted feature amount in a temporary feature-amount storing unit that temporarily stores information in association with the feature-amount of the information, in a parallel manner, wherein
when amount of the information registered in the temporary feature-amount storing unit is equal to or more than a predetermined amount, calculating the similarity includes executing a process of calculating the similarity between the feature-amount of the information registered in the temporary feature-amount storing unit and the feature amount searched by the searching unit, in a parallel manner.

15. The information management method according to claim 12, further comprising metadata-searching including, when an instruction to search for information with the metadata as a search key from a user, searching for the information corresponding to the metadata designated as the search key from a metadata storing unit that stores information in association with metadata indicating attribute of the information, using the metadata as a search key, wherein
searching for the second feature amount includes
acquiring the similarity-information list corresponding to the information searched by the metadata-searching unit from the similarity-information list storing unit; and
outputting information that is more included in the similarity-information list prior to information that is less included in the similarity-information list, as a search result.

16. The information management method according to claim 12, further comprising temporary registering information to be registered in association with the extracted feature-amount in a temporary feature-amount storing unit that temporarily stores information in association with a feature-amount of the information, wherein
when amount of the information registered in the temporary registering unit is equal to or more than a predetermined amount, calculating the similarity includes executing a process of calculating the similarity between the feature amount of the information registered in the temporary feature-amount storing unit and the second feature amount, in a parallel manner.

17. The information management method according to claim 16, wherein
when an instruction to search for the similarity information of arbitrary information is received from a user, the calculating includes calculating the similarity between the feature-amount of the information registered in the temporary feature-amount storing unit and the feature amount of the arbitrary information, and
searching for the second feature amount includes
acquiring the information in association with the feature-amount of which the similarity is larger than the threshold from the temporary feature-amount storing unit as the similarity information;
outputting the acquired information as a search result;
acquiring the similarity-information list in association with the arbitrary information from the similarity-information-list storing unit; and
outputting the similarity information included in the acquired similarity information list as the search result.

18. The information management method according to claim 12, wherein
the information is image information, and
the feature-amount represents contents of the image information.

19. A computer program product comprising a non-transitory computer usable medium having computer readable program codes embodied in the medium that when executed causes a computer to execute a method comprising:

extracting a first feature amount of first information that is target information to be registered, from a metadata storing unit;

searching for a second feature amount of second information from a feature-amount storing unit that stores information in association with a feature-amount representing contents of the information;

calculating a similarity between the first feature amount and the second feature amount, the similarity indicating a degree of being similar to the feature-amount of the information; and registering the first information in association with a similarity-information list in a similarity-information-list storing unit, the similarity-information list including the second information corresponding to the second feature amount of which the calculated similarity is larger than the threshold, as the similarity information.

* * * * *